United States Patent
Noorani et al.

(10) Patent No.: US 12,141,820 B2
(45) Date of Patent: Nov. 12, 2024

(54) GREENHOUSE GAS EMISSIONS CONTROL BASED ON MARGINAL EMISSION FACTOR DATA AND ENERGY STORAGE SYSTEMS

(71) Applicant: PEAK POWER, INC., Toronto (CA)

(72) Inventors: Imran Noorani, Toronto (CA); Nathan Ota, Berkeley, CA (US); Meysam Sahafzadeh, Toronto (CA); Mehrdad Shirinbakhsh Masouleh, Mississauga (CA)

(73) Assignee: PEAK POWER, INC., Toronto (CA)

( * ) Notice: Subject to any disclaimer, the term of this patent is extended or adjusted under 35 U.S.C. 154(b) by 0 days.

(21) Appl. No.: 18/166,836

(22) Filed: Feb. 9, 2023

(65) Prior Publication Data

US 2024/0273544 A1    Aug. 15, 2024

(51) Int. Cl.
*G06Q 50/06*     (2024.01)
*G06Q 10/0637*   (2023.01)
*G06Q 30/018*    (2023.01)

(52) U.S. Cl.
CPC ..... *G06Q 30/018* (2013.01); *G06Q 10/06375* (2013.01); *G06Q 50/06* (2013.01)

(58) Field of Classification Search
CPC .............................. G06Q 50/06; G06Q 30/018
See application file for complete search history.

(56) References Cited

U.S. PATENT DOCUMENTS

| | | | |
|---|---|---|---|
| 2009/0062970 A1* | 3/2009 | Forbes, Jr. | G06Q 10/06 700/295 |
| 2010/0138190 A1 | 6/2010 | McConnell et al. | |
| 2012/0053848 A1* | 3/2012 | Doi | H02J 3/32 702/24 |
| 2012/0296482 A1 | 11/2012 | Steven et al. | |
| 2013/0024035 A1* | 1/2013 | Ito | B60L 53/51 700/291 |

(Continued)

FOREIGN PATENT DOCUMENTS

WO    WO-2010098455 A1 *    9/2010    ............. G06Q 30/04

OTHER PUBLICATIONS

Hulber et al "Carbon efficient Smart Charging using Forecasts of Marginal Emission Factors", Journal of Cleaner Production, published Sep. 24, 2020, accessed Mar. 5, 2024 (Year: 2020).*

(Continued)

*Primary Examiner* — Andrew Chase Lakhani
(74) *Attorney, Agent, or Firm* — James De Vellis; Foley & Lardner LLP

(57) ABSTRACT

The present solution utilizes marginal emission factor (MEF) data to monitor a greenhouse gas (GHG) impact of an asset, determine a potential to reduce the GHG impact by the asset, and generate operating parameters or settings for a battery at the asset site to reduce the GHG impact through efficient battery operation. For instance, a system can identify a MEF data set of an electricity provider. The system can identify a second data set of measurements of a battery of an asset. The system can determine MEF values corresponding to use of the battery based on the plurality of values and the plurality of measurements over the time period. The system can determine an amount of greenhouse gas or carbon associated with the asset.

20 Claims, 6 Drawing Sheets

(56) References Cited

U.S. PATENT DOCUMENTS

| | | | | |
|---|---|---|---|---|
| 2013/0166043 A1* | 6/2013 | Bozchalui | ............ | G05B 19/042 |
| | | | | 700/29 |
| 2013/0211799 A1* | 8/2013 | Keeli | .................... | H01M 10/48 |
| | | | | 703/2 |
| 2013/0260188 A1* | 10/2013 | Coates | .................. | H01M 10/42 |
| | | | | 429/61 |
| 2013/0297084 A1* | 11/2013 | Kubota | ..................... | H02J 3/32 |
| | | | | 700/286 |
| 2014/0039710 A1* | 2/2014 | Carter | .................. | G05B 13/041 |
| | | | | 700/291 |
| 2019/0165579 A1* | 5/2019 | Ichien | ............... | H02J 13/00004 |
| 2020/0372588 A1* | 11/2020 | Shi | .......................... | G06Q 50/06 |
| 2022/0385064 A1* | 12/2022 | Cruickshank, III | ... | G06Q 50/06 |
| 2022/0390137 A1* | 12/2022 | Wenzel | ................ | G06Q 10/063 |
| 2023/0020417 A1* | 1/2023 | Elbsat | .............. | G06Q 10/06313 |

OTHER PUBLICATIONS

International Search Report and Written Opinion on PCT/IB2023/062550 dated Mar. 18, 2024.

\* cited by examiner

GREENHOUSE GAS EMISSIONS CONTROL BASED ON MARGINAL EMISSION FACTOR DATA AND ENERGY STORAGE SYSTEMS

BACKGROUND

A utility provider can distribute electricity to various customer locations, including office buildings, factories, hotels, homes, hospitals or enclosed communities. Customer locations can include any number of electrical devices consuming electrical load from the provider, including electronic devices, machines, tools, industrial systems and others. Customer locations can also include devices storing electrical energy.

SUMMARY

This technical solution is directed to controlling greenhouse gas emissions based on marginal emission factor data and energy storage system. For example, this technology can allow electrical utility users to determine an amount of greenhouse gas (GHG) emissions impact at the customer site, determine a potential for reducing the GHG impact and generate operational parameters for energy storage systems (e.g., batteries) to reduce the GHG impact at the user site while saving energy. When providing electricity to customer sites, electrical utility providers can experience shifts in the demand for the electricity by the utility users. Such shifts in the demand can cause the utility providers to use their various electricity sources to adjust the amount of electricity produced in order to meet the changing demand. In such instances, a demand for electricity can rapidly increase, causing certain types of electricity sources (e.g., gas turbines in natural gas power plants) to more quickly scale up their electricity production than other types of electricity sources, such as, for example nuclear power plants whose electrical output is usually steadier.

As different electricity sources produce different amounts of GHG emissions based on their technology and throughput, the changes in the GHG emissions can be reflected in the marginal emission factor (MEF) data corresponding to the produced electricity. The electricity provided by utility provider combining various types of electricity sources can have its MEF data vary over time, depending on the types of electricity sources contributing to its electrical output. As a result, the MEF data can be indicative of the amount GHG emissions for the electricity provided over time. A utility user at the customer site can therefore take advantage of the changes in the MEF data of the electricity received from the utility provider to monitor and adjust its own GHG impact on the environment.

The present disclosure allows an electrical utility customer to take advantage of the MEF data to monitor, asses and adjust its GHG production or carbon equivalent impact on the environment. For example, the present solution allows the utility customer of an asset or a site to use MEF data to assess the present carbon equivalent or GHG impact of the asset on the environment, determine a potential to reduce the carbon equivalent or GHG impact by the asset and adjust the operation of the energy storage systems (e.g., batteries) of the asset to minimize the GHG impact by the asset or site. By allowing the utility customer to provide energy to the electrical devices from its energy storage system while the MEF data is maximized and receive electricity from the utility provider to charge the energy storage system while the MEF data is minimized, the utility customer can offset (e.g., reduce) the GHG impact of the site on the environment while saving energy and reducing its energy consumption.

At least one aspect of the present disclosure is directed to a system. The system can include a system to determine an amount of greenhouse gas associated with an asset. The system can include one or more processors coupled with memory. The one or more processors can be configured to identify a first data set comprising a plurality of values corresponding to marginal emission factor (MEF) of electricity provided by a provider of electricity over a time period. The one or more processors can be configured to identify a second data set comprising a plurality of measurements corresponding to power of a battery of an asset coupled with the provider of electricity over the time period. The one or more processors can be configured to determine a plurality of MEF values corresponding to use of the battery based on the plurality of values and the plurality of measurements over the time period. The one or more processors can be configured to generate a value corresponding to an amount of carbon associated with the asset using the battery over the time period and based on the plurality of MEF values.

At least one aspect of the present disclosure is directed to a method. The method can be a method to determine an amount of greenhouse gas offset by a battery. The method can include a data processing system identifying a first data set comprising a plurality of values corresponding to marginal emission factor (MEF) of electricity provided by a provider of electricity over a time period. The method can include the data processing system identifying a second data set comprising a plurality of measurements corresponding to power of a battery of an asset coupled with the provider of electricity over the time period. The method can include determining, by the data processing system, a plurality of MEF values corresponding to use of the battery based on the plurality of values and the plurality of measurements over the time period. The method can include the data processing system generating a value corresponding to an amount of carbon associated with the asset using the battery over the time period and based on the plurality of MEF values.

At least one aspect of the present disclosure is related to a non-transitory computer-readable medium having processor readable instructions. The instructions can be such that, when executed, cause one or more processors to identify a first data set comprising a plurality of values corresponding to marginal emission factor (MEF) of electricity provided by a provider of electricity over a time period. The instructions can cause the one or more processors to identify a second data set comprising a plurality of measurements corresponding to power of a battery of an asset coupled with the provider of electricity over the time period. The instructions can cause the one or more processors to determine a plurality of MEF values corresponding to use of the battery based on the plurality of values and the plurality of measurements over the time period. The instructions can cause the one or more processors to generate a value corresponding to an amount of carbon associated with the asset using the battery over the time period and based on the plurality of MEF.

At least one aspect of the present disclosure is related to a system to determine a greenhouse gas mitigation potential of a battery. The system can include a data processing system having one or more processors. The one or more processors can receive a plurality of values indicative of a marginal emission factor (MEF) of electricity provided by a provider of electricity coupled with a battery. The one or more processors can identify, within a subset of the plurality of values, a highest value of the plurality of values of the subset. The one or more processors can identify, within the subset, a lowest value of the plurality of values of the subset. The one or more processors can determine a carbon offset to achieve using the battery based on a difference between the highest value adjusted for a loss in energy corresponding at least to electricity transmission associated with the battery and the lowest value.

At least one aspect of the present disclosure is related to a method to determine a greenhouse gas mitigation potential of a battery. The method can include a data processing system receiving a plurality of values indicative of a marginal emission factor (MEF) of electricity provided by a provider of electricity coupled with a battery. The method can include the data processing system identifying within a subset of the plurality of values, a highest value of the plurality of values of the subset. The method can include identifying, by the data processing system, within the subset, a lowest value of the plurality of values of the subset. The method can include the data processing system determining a carbon offset to achieve using the battery based on a difference between the highest value adjusted for a loss in energy corresponding at least to electricity transmission associated with the battery and the lowest value.

At least one aspect of the present disclosure is related to a non-transitory computer-readable medium having processor readable instructions. The instructions can be such that, when executed, cause one or more processors to receive a plurality of values indicative of a marginal emission factor (MEF) of electricity provided by a provider of electricity coupled with a battery. The instructions can cause the one or more processors to identify, within a subset of the plurality of values, a highest value of the plurality of values of the subset. The instructions can cause the one or more processors to identify, within the subset, a lowest value of the plurality of values of the subset. The instructions can cause the one or more processors to determine a carbon offset to achieve using the battery based on a difference between the highest value adjusted for a loss in energy corresponding at least to electricity transmission associated with the battery and the lowest value.

At least one aspect of the present disclosure is related to a system. The system can be a system to reduce a greenhouse gas emission of an asset using a battery. The system can include a data processing system having one or more processors. The one or more processors can be configured to identify a plurality of values corresponding to a marginal emission factor (MEF) of a provider of electricity coupled with a battery. The one or more processors can be configured to determine a discharge period to discharge the battery according to a time interval for which a subset of the plurality of values adjusted for a loss in energy corresponding to power transmission exceeds a threshold. The one or more processors can be configured to determine a charge period to charge the battery according to a second time interval for which a second subset of values of the plurality of values remains below the threshold. The one or more processors can be configured to provide a setting to operate the battery according to the charge period and the discharge period.

At least one aspect of the present disclosure is related to a method. The method can be a method of reducing a greenhouse gas emission of an asset using a battery. The method can include a data processing system identifying a plurality of values corresponding to marginal emission factor (MEF) of a provider of electricity coupled with a battery. The method can include the data processing system determining a discharge period to discharge the battery according to a time interval for which a subset of the plurality of values adjusted for a loss in energy corresponding to power transmission exceeds a threshold. The method can include determining, by the data processing system, a charge period to charge the battery according to a second time interval for which a second subset of values of the plurality of values remains below the threshold. The method can include providing, by the data processing system, a setting to operate the battery according to the charge period and the discharge period.

At least one aspect of the present disclosure is related to a non-transitory computer-readable medium having processor readable instructions. The instructions can be such that, when executed, causes one or more processors to identify a plurality of values corresponding to marginal emission factor (MEF) of a provider of electricity coupled with a battery. The instructions can cause the one or more processors to determine a discharge period to discharge the battery according to a time interval for which a subset of the plurality of values adjusted for a loss in energy corresponding to power transmission exceeds a threshold. The instructions can cause the one or more processors to determine a charge period to charge the battery according to a second time interval for which a second subset of values of the plurality of values remains below the threshold. The instructions can cause the one or more processors to provide a setting to operate the battery according to the charge period and the discharge period.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
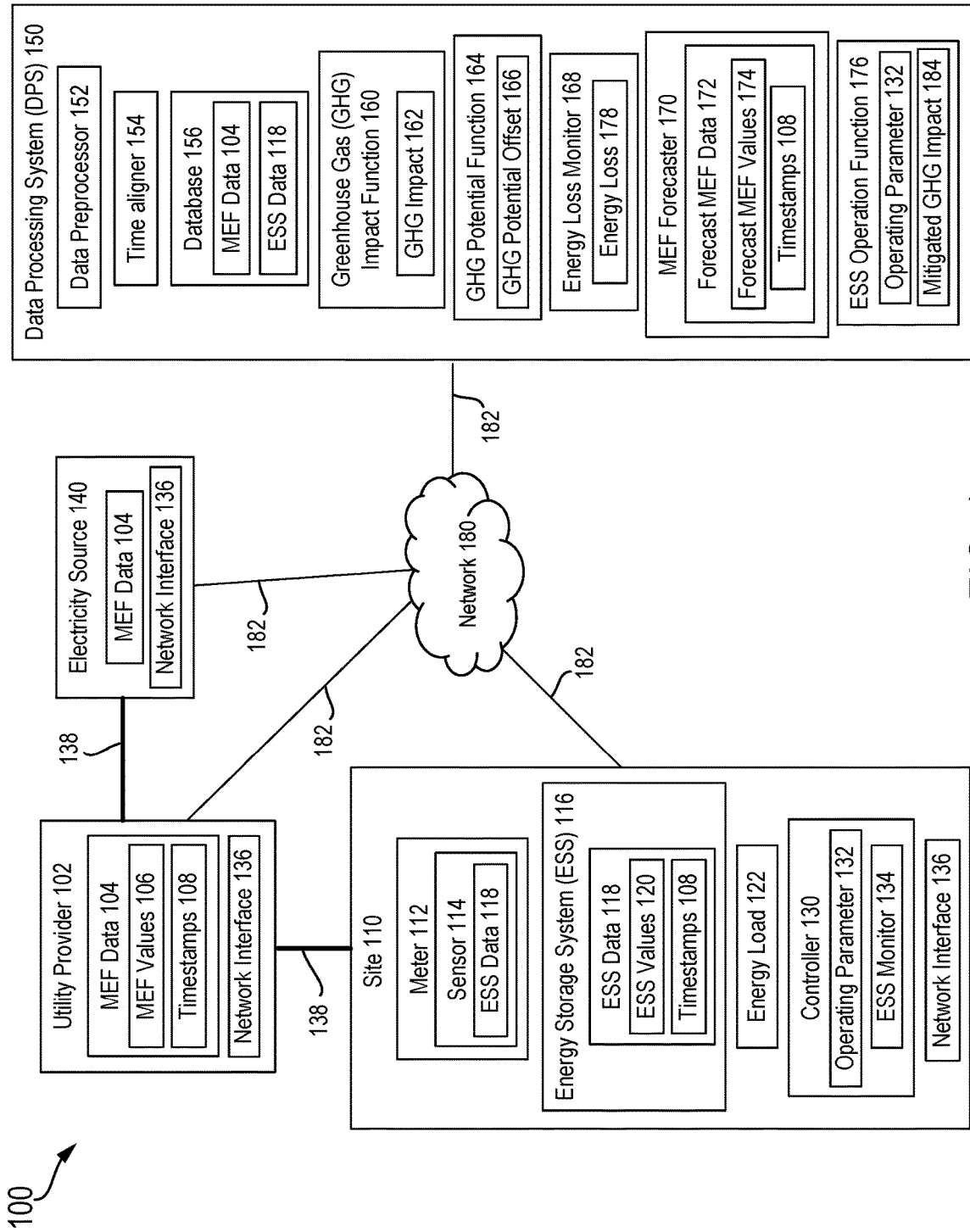
FIG. 1 illustrates an example system to monitor and manage GHG emissions of an asset using MEF data to operate the energy storage systems of the asset.

Following below are more detailed descriptions of various concepts related to, and implementations of, methods, apparatuses, and systems for controlling GHG emissions based on MEF data and energy storage systems. The various concepts introduced above and discussed in greater detail below may be implemented in any of numerous ways.

When an electrical utility provider distributes electricity to various customer sites, the utility provider can use one or more electricity sources (e.g., power plants) to provide the electricity distributed to the customers. The electricity can be generated by any electricity sources, including wind power plants, solar power plants, nuclear power plants, coal-powered power plants or natural gas power plants. Depending on the technology used by the power plants to produce the electricity, the electrical output from a power plant have different levels of greenhouse gas (GHG) impact on the environment. The greenhouse gas levels or impact can correspond to any greenhouse gas, such as carbon dioxide (CO2), methane (CH4), nitrous oxide (N2), ozone (O3) or any greenhouse gas equivalent, such as for example the CO2 equivalent. For example, the amount of GHG or carbon equivalent produced by the power plant can be measured in the units of grams or kilograms of carbon dioxide (CO2) equivalent per unit of electricity produced, or in short gCO2e/kWh (e.g., grams of carbon dioxide equivalent per kilowatt hour of energy produced). As a result, the electrical output of a wind turbine or solar farm can have a lower gCO2e/kWh than the electrical output of a gas turbine in a natural gas power plant.

However, as electrical utility providers experience changes in demand from their consumers, the utility providers can use varying types of electricity sources (e.g., different types of power plants) to address the demand change. For example, a utility provider can experience a sudden increase in the electricity demand, and in response to the demand increase use an electricity source that can most quickly scale up its production (e.g., a natural gas power plant) rather than a source whose output may remain unchanged (e.g., nuclear power plant). As a result of the electricity demand being more quickly addressed by some power plants rather than others, the electricity provided by the utility provider can have varying gCO2e/kWh over time.

By correlating the rate at which GHG emissions change with respect to a change in electricity load, this technical solution can use marginal emission factor (MEF) data to monitor the GHG emissions associated with the electricity being utilized by an asset (e.g., a site). As MEF data can be formatted to include periodic (e.g., hourly) measurements of MEF values corresponding to the electricity provided, this data can be used to monitor the GHG impacts of the utility customers on the environment. As a result, a consumer at a site receiving electricity from the utility provider can take advantage of the MEF data associated with the electricity received to determine the GHG impact of the site (e.g., the asset), identify the potential to minimizing the GHG impact of the site and adjust the operation of the energy storage systems (e.g., batteries) of the site in order to reduce the GHG impact on the environment.

For example, the present solution can take advantage of a difference in the timing when an energy storage system (e.g., a battery) of a site is charging and discharging to mitigate GHG emissions. The present solution can determine a coefficient alpha (a) value for determining an alignment between the operation (e.g., charging and discharging times) of the energy storage system and the MEF data. The present solution can use a gradient of MEF data (e.g., peaks or local or periodic maximum values as well as valleys or local or periodic minimum values) to utilize electricity whose GHG emissions are lower (e.g., cleaner energy) to charge the energy storage system, while using the energy from the energy storage system when the GHG emissions of the electricity are higher. The present solution can take into account the energy losses associated with charging and discharging of the energy storage system to select the timing for the charging and discharging of the energy storage system when the energy losses are minimized.

FIG. 1 depicts is an example of a system 100 for using MEF data to monitor or determine a GHG impact associated with a customer site, establish a potential to reduce the GHG impact at the site, and generate settings for operating the energy storage system to reduce the GHG impact at the site. In the example system 100, one or more utility providers 102 can utilize power lines 138 to receive electricity from one or more electricity sources 140 and provide the electricity to one or more customer sites 110. One or more data processing systems (DPS) 150 can communicate with one or more electricity sources 140, one or more utility providers 102 and sites 110 via communication lines 182 and a network 180. A utility provider 102 can include a network interface 136 and MEF data 104, which can include MEF values 106 with their corresponding timestamps 108. A site 110 can include one or more meters 112, one or more energy storage systems (ESS) 116, one or more energy loads 122, one or more controllers 130 and one or more network interfaces 136. A meter 112 can include a sensor 114 measuring ESS data 118. An ESS 116 can include ESS data 118. ESS data 118 can include ESS values 120 with their corresponding timestamps 108. A controller 130 can include operating parameters 132 and ESS monitor 134. Electricity source 140 can include MEF data 104 and one or more network interfaces 136. A DPS 150 can include one or more data preprocessors 152, time aligners 154, databases 156, GHG impact functions 160, GHG potential functions 164, Energy loss monitors 168, MEF forecasters 170 and ESS operation functions. A database 156 can include MEF data 104 and ESS data 118. A GHG impact function 160 can include or provide a GHG impact 162. A GHG potential function 164 can include or provide a GHG potential offset 166. An energy loss monitor 168 can include or provide an energy loss 178 corresponding to charge or discharge of the ESS 116. A MEF forecaster 170 can include a predicted MEF data 172 having predicted MEF values 174 and their corresponding timestamps 108. An ESS operation function 176 can include or provide an operating parameter 132.

A system 100 of FIG. 1 can utilize MEF data 104 from electricity sources 140 or a utility provider 102 to determine a GHG impact for a site 110. The system 100 can utilize the MEF data 104 to determine a potential for GHG mitigation at the site 110 and generate operational parameters 132 (e.g., settings) to operate the ESS 116 to reduce the GHG impact (e.g., the carbon equivalent produced) at the site 110. For example, a utility provider 102 can provide electricity to the site 110 via power lines 138 as well as provide MEF data 104 via a network 180. At a site 110, a meter 112 can utilize sensor 114 to measure ESS data 118 (e.g., charging or discharging data of the batteries) of the ESS 116, which can include ESS values 120 and their corresponding timestamps 108. A DPS 150 can preprocess MEF data 104 and ESS data 118 using a preprocessor 152 and align the ESS values 120 and the MEF values 106 according to their timestamps 108 (e.g., align the two data sets temporally). A GHG function 160 can utilize the MEF data 104 and the ESS data 118 from the database 156 to determine a GHG impact 162 corresponding to the site 110. DPS 150 can utilize an energy loss monitor 168 to determine the energy loss 178 as well as the MEF data 104 to determine, via a GHG potential function 164, the GHG potential offset 166 that site 110 could achieve under some desired conditions. DPS 150 can also utilize the ESS operation function 176 and the MEF forecaster 170, along with the predicted MEF data 172, to determine the operating parameters 132 for controlling the ESS 116 operation via the controller 130.

A utility provider 102 can include generator, producer or provider of electricity to customer sites, such as a site 110. Utility provider 102 can include an electric company that can utilize its own electricity sources 140 or receive electricity from external sources to address electricity usage of the users at sites 110. Utility provider 102 can include any number of electric companies or power plants working together to provide electricity via power lines 138. Utility provider 102 can include the functionality, including infrastructure, systems and supplies, for distributing electricity to sites 110, such as power supplies, transformers, power lines 138 including homes, apartment buildings, factories, companies and other locations or establishments that use electricity. Utility provider 102 can include the company that monitors the utility meter 112 at a site 110 and charges for the electricity utilized based on the meter 112 measurements. Utility provider 102 can receive electricity from any number of electricity sources 140 and can adjust the MEF data 104 of the electricity provided by the utility provider 102 based on MEF data 104 of the electricity from the electricity sources 140. Utility provider can include local or remote devices (e.g., servers) or services (e.g., cloud computing systems or applications) storing or providing MEF data 104 over a network 180.

Electricity source 140 can include any source of electricity, such as a power plant utilizing any technology generating electrical power or energy. For example, electricity source 140 can include a solar power plant, a wind power plant, a natural gas power plant, a burning-fired power plant, a diesel-fired power plant, a hydroelectric power plant, a geothermal power plant or any other facility or plant generating electricity. Electricity source 140 can be comprised within a utility provider 102 or can be independent form the utility provider 102. Utility provider 102 can receive electricity from the electricity source 140 via power lines 138. Electricity source 140 can include MEF data 104 corresponding to electricity generated by the electricity source 140. Electricity source 140 can include local or remote devices (e.g., servers) or services (e.g., cloud computing systems or applications) storing or providing MEF data 104 over a network 180.

MEF data 104 can include any data indicative of incremental change in carbon emissions. MEF data 104 can comprise of or include a series or an array of MEF values 106. MEF values 106 can correspond to, or be indicative of, carbon emissions (e.g., $CO_2$ equivalent) for a particular unit of electricity throughput (e.g., for a kilo-Watt hour, or kWh). MEF data 104 can include MEF values 106 where each one can indicate a measurement or determination of an amount $CO_2$ equivalent for a particular amount of electrical energy at a particular time window or a duration. For example, MEF data 104 can include a stream of MEF values 106 taken every minute, 5 minutes, 15 minutes, an hour or every several hours. Each timestamp 108 can indicate a time or a time window of a measurement (e.g., a time at which a MEF value 106 is taken), such as a date and time of a measurement or a determination. Timestamp 108 can indicate a time window to which a MEF value 106 corresponds (e.g., a time window of 1 hour for a particular MEF value 106). For each point in time or for each time duration to which a MEF value 106 corresponds, the MEF value 106 can indicate the $CO_2$ equivalent linked to that period of time. Each MEF value 106 can therefore include a corresponding timestamp 108 corresponding to a time window within which MEF value 106 represents the amount of $CO_2$ equivalent generated. MEF data 104 can therefore include an array of two value pairs (e.g., a MEF value 106 and a corresponding timestamp 108) and can include any duration of data (e.g., any number of pairs of MEF values 106 and timestamps 108).

A site 110, sometimes also referred to as a customer site 110 or an asset 110, can include any location or structure to which electricity is delivered or supplied by the utility provider 102. A site 110 can include one or more apartments, homes, buildings, factories, campuses, lots or studios. A site 110 can include a complex or a group of structures or homes in a particular area, such as a gated community, a vacation resort, a corporation building complex or a residential network of buildings. Site 110 can include one or more farms, warehouses, hotels, hospitals or any man-made structures that can include electrical lines (e.g., power lines 138) interconnected to electricity sockets to which energy loads 122 can plug to consume electricity. A site can be a family home or a region, such as a neighborhood, a town or a municipality having many family homes, businesses and facilities. A site 110 can include one or more ESSs 116 for storing energy and a controller 130 for controlling the operation of the ESS 116 system. Site 110 can include a network interface 136 for communicating with a DPS 150, utility provider 102 or electricity source 140. A site 110 can include a local grid 204 along with any of its structures or features.

A meter 112 can include any device that measures electricity (e.g., in kilowatt-hours) traversing across the meter 112. For example, a meter 112 can be a utility meter and measure electricity consumed by a user at a site 110 by measuring electricity between the site 110 of the user (e.g., a home) and the utility provider 102. For example, a meter 112 can be a sub-meter inside of a site 110 and measure electricity between an ESS 116 and energy load 122 or between ESS 116 and utility provider 102. Meter 112 can include an electricity measuring device or a circuit, monitoring and measuring the amount of electricity provided to an ESS 116, energy load 122 or utility provider 102 over a time interval. Meter 112 can be deployed with, connected to, or otherwise be a part of the electrical connection between the utility provider 102 (e.g., utility grid 202) and the site 110 (e.g., the local grid 204). Meter 112 can measure demand, such as maximum usage of energy at some time interval, as well as the cost of the electricity used. Meter 112 can include a smart meter for real-time readings and load monitoring. Meter 112 can measure data, such as ESS data 118 (e.g., electricity) including a plurality of ESS values 120 and for each of the plurality of ESS values 120 a corresponding plurality of timestamps 108. Meter 112 can include the functionality for communicating with electronic communication devices over a network, such as network 180.

Sensor 114 can include any combination of hardware and software for measuring electricity. Sensor 114 can include an electrical or electronic circuit for measuring power throughput, including current (e.g., in Amperes or A), voltage (e.g., in Volts or V), power (e.g., in Watts or W) or energy (e.g., in Watt-hours or kWh). Sensor 114 can measure electrical throughput through a point (e.g., a meter 112) in time intervals, such as every second, every minute, every 5 minutes, 10 minutes, 15 minutes, 30 minutes or every 1 or more hours. Sensor 114 can measure electricity along with timestamps 108

ESS data 118 can include any data corresponding to electricity throughput of the ESS 116. ESS data 118 can include data or measurements on electricity coming into the ESS 116 (e.g., charging). ESS data 118 can include data or measurements on electricity going out of the ESS 116 (e.g., discharging). ESS data 118 can include any number of ESS values 120. Each ESS values 120 can correspond to a single measurement or determination of electricity at a point in time, or during a time window. For example, an ESS value 120 can include a measurement of current (e.g., Amperes or A, voltage (e.g., Volts or V), power (e.g., Watts or W) or energy (e.g., kilo-Watt hours or kWh).

ESS data 118 can include pairs of ESS values 120 along with their corresponding timestamps 108. For example, ESS data 118 can include an array of pairs of ESS values 120 and timestamps 108. Each ESS value 120 can include a corresponding timestamp 108. ESS data 118 can include an array of pairs of values (e.g., ESS values 120 and timestamps 108) where for each ESS value 120 a corresponding timestamp 108 identifying the data and time of the ESS value 120. For example, ESS data 118 can include an ESS values 120 taken every 5 minutes, where each ESS value 120 is associated with a corresponding timestamp 108 identifying the time (e.g., in 5 minute intervals) at which the ESS values 120 are measured or determined.

Energy load 122 can include any device, machine, system or an apparatus consuming electricity. Energy load 122 can correspond to devices, such as electronic devices, including smart phones, computers or displays. Energy load 122 can include electrical appliances, such as laundry washing machines and dryers, refrigerators, lighting devices, alarms or any other devices utilizing electricity. Energy loads 122 can be electrically coupled with electrical or power lines, such as electrical lines within a site 110 (e.g., local grid 204). Energy load 122 can correspond to any devices consuming electricity when connected to electrical sockets at a site 110 (e.g., the local grid 204). Energy load 122 can include energy generating devices, such as solar or wind turbines producing electricity at a site 110, such as a solar farm providing electricity to charge ESS 116.

Energy storage system (ESS) 116 can include any device or a system for storing energy. ESS 116 can include, hardware, software or a combination of hardware and software for storing, managing and controlling electrical energy. ESS 116 can include, for example, a battery system, including any type and form of a battery for storing electrical energy. For example, ESS 116 can include any number of battery cells that can be combined into any number of battery modules or battery packs storing any amount of energy on a site 110 (e.g., collectively a battery or a battery system). ESS 116 can include multiple storage banks and can include or be connected to a logic, circuitry or devices for controlling and managing charging and discharging of the ESS 116 (e.g., charging or discharging of the battery), monitoring the battery operation or controlling the operation of the battery.

ESS 116 can include any type of a battery, including for example one or more lithium-ion battery cells, nickel metal hydride battery cells or alkaline battery cells. ESS 116 can include one or more solid state batteries. ESS 116 can include a battery that includes or uses solid electrolytes, including oxides, sulfides, phosphates, polyethers, polyesters, nitrile-based materials, polysiloxane and polyurethane. ESS 116 can include functionality for monitoring, setting and controlling the state or rate of charge or discharge of the ESS 116, such as a controller 130. ESS 116 can keep track of the amount of energy stored in terms of one or more of Watts (W) multiplied by hours (h), such as Watt-hours (Wh), kilo-Wh (kWh), mega-Wh (MWh) or giga-Wh (GWh) of energy.

ESS 116 can be receive electricity (e.g., charge) or provide electricity (e.g., discharge). ESS 116 can charge or discharge based on operating parameters 132 and in response to instructions or settings from a controller 130. ESS 116 can include a battery system onboard a vehicle, a machine or an electronic device. For example, ESS 116 can include any number of batteries of any number of hybrid or electric vehicles, scooters or motorcycles. For example, a battery system of an ESS 116, such as an electric vehicle, can be connected to the local grid 204 via a bi-directional charger (e.g., an energy load 122).

Operating parameter 132 can include any one or more parameters, settings, configurations, instructions or commands for operating ESS 116. Operating parameter 132 can include set points for an ESS 116. For example, operating parameter 132 can include a set point or setting having a target value for an amount of electricity to be output from ESS 116 (e.g., during a discharge of the battery) or input into the ESS 116 (e.g., during a charge of the battery). Operating parameter 132 can include a timing of when the ESS 116 is to be charged or discharged. For example, operating parameter 132 can include a date and time when charging of ESS 116 or discharging of ESS 116 is to occur. Operating parameter 132 can include a schedule (e.g., a daily, weekly, monthly or annual schedule) identifying charge times and discharge times of the ESS 116. For example, an operating parameter 132 can identify a time duration (e.g., a day or a week) when ESS 116 is to be charging or discharging. ESS 116 can include the rate of charge or discharge of the ESS 116 and the source of the charge and discharge.

Controller 130 can include any hardware, software or a combination of hardware and software for communicating with and controlling ESSs 116 on a site 110. Controller 130 can include the logic, circuitry and devices for controlling operation, such as charging or discharging of ESS 116, individually or as a collective. Controller 130 can include one or more microcontrollers, memory, processors or logic devices. Controller 130 can include programming code, software functions and scripts. Controller 130 can control a rate at which the ESS 116 charges or discharges (e.g., Amperes, Volts, Watts or kilo-Watt hours) for charge or discharge of ESS 116.

Controller 130 can include or be coupled with an ESS monitor 134. ESS monitor 134 can include a function, device or a circuit for monitoring ESS 116 operation. ESS monitor 134 can interface or communicate with meters 112 that can measure ESS 116 electrical throughput, such as electricity going into or coming out of ESS 116 via the meter 112. ESS monitor 134 can include meter 112 and any functionality of the meter 112, including sensor 114. ESS monitor 134 can track charge times or discharge times of the ESS 116 and can store or provide this information to DPS 150. For example, ESS monitor 134 can monitor ESS data 118 and provide ESS data, via network 180, to DPS 150 to store in the database 156. ESS monitor 134 can monitor and provide to the DPS 150 any information on the operation or state of the ESS 116, such as a state of charge, a rate of charge, a rate of discharge, a charge time or a discharge time of the ESS.

ESS monitor 134 can monitor losses associated with power distribution on the site 110. For example, ESS monitor 134 can gather data from meters 112 and the ESS 116 and use the data to determine energy losses due to transmission of between the ESS 116 and the utility provider 102 (e.g., the meter 112 between the utility grid 202 and the local grid 204 of the site 110). ESS monitor 134 can communicate with the energy loss monitor 168 to provide the energy loss data to the energy loss monitor 168.

ESS monitor 134 can monitor ESS data 118 to determine charge periods and discharge periods of the ESS 116. For example, ESS monitor 134 can utilize timestamps 108 of the ESS values 120 to determine timestamps 108 for which ESS values 120 indicate that the ESS 116 is charging and timestamps 108 for which ESS values 120 indicate the ESS 116 is discharging. ESS monitor 134 can determine time periods corresponding to charging of the ESS 116 and time periods corresponding to discharging of the ESS 116. ESS monitor 134 can determine, from the ESS data 118, the timing schedule or settings of the ESS 116 with respect to the timing and rate of charge and discharge of the ESS 116. ESS monitor 134 can communicate with the GHG impact function 160, GHG potential function 164 and the ESS operation function 176 to allow them to use the information on charge and discharge periods and rates of the ESS 116. GHG impact function 160, GHG potential function 164 and the ESS operation function 176 can each include ESS monitor 134.

Network interface 136 can include any hardware, software or a combination of hardware and software for interfacing with any devices on system 100. Network interface 136 can include logic, circuitry, devices, computer code and scripts for establishing and implementing communications (e.g., sessions or data exchange) between any one of utility provider 102 electricity source 140, DPS 150 and any device or system on a site 110, such as the meter 112, ESS 116, energy loads 122, controller 130 or network interface 136. Network interface 136 can communicate via any communication line 182. A communication line 182 can include any type and form of an avenue to exchange communication, such as a wireline, a cable, a wireless link, a cellular connection (e.g., via a 4G or a 5G cellular network), a Wi-Fi connection or a Bluetooth connection. Network interface 136 can include any functionality for communicating via conductor lines or wirelessly. Network interface 136 can include the functionality for communicating via a network 180 or via a grid (e.g., a utility grid 202 or local grid 204). Network interface 136 can include any computer or a digital system interface for digital communication or interaction between different network devices, such as a modem or a network communication card. Network interface 136 can include a web browser interface, a graphical user interface, a menu interface, a form based interface or a natural language interface via which devices (or users) can receive and send data. Network interface 136 can be included in or used by any utility provider 102, electricity source 140, DPS 150, or any devices, systems or components on the site 110 (e.g., meter 112, ESS 116 or energy loads 122).

Network 180 can include any type of communication network, such as a worldwide network and/or a local area network. Network 180 can include a wireless network or a network of physically coupling network components. The network 180 can include a network implementing network components via a cloud. Network 180 can allow for communicating via network communication protocols, such as the transmission control protocol/internet protocol (TCP/IP). Network 180 can include a cloud environment, including shared computer resources and data that can be available on demand. The network 180 can be local network, wide area network or a world wide web. Network 180 can be hosted inside or outside the parameters of the local grid 204.

Data processing system 150 can include any system for determining, controlling or managing operation of ESSs 116. Data processing system 150 can include hardware, software or a combination of hardware and software for utilizing MEF data 104 to determine the state of GHG impact by a site 110, determine a potential to minimize a GHG impact by a site or determine operating parameters 132 so as to reduce or minimize the GHG impact by the site 110. Data processing system 150 can include instructions, logic, circuitry, devices, computer code and scripts for controlling, managing or operating devices on a local grid, such as ESS 116. Data processing system 150 can include functionality for receiving and monitoring ESS data 118 or MEF data 104. Data processing system 150 can include the functionality to determine the GHG impact (e.g., amount of $CO_2$ equivalent) that corresponds to a site 110 based on the electricity consumption of the site 110. Data processing system 150 include and utilize a GHG impact function 160 to determine a GHG impact 162 of a site 110, a GHG potential function 164 to determine a GHG potential offset 166 and a ESS operational function 176 to determine operating parameters 132 for operating the ESS 116 in a manner in which the GHG impact of the electricity used at the site 110 will be reduced.

Data processing system 150 can be deployed or provided on any computing device or service. For example, DPS 150 can be provided by a computing device or a service of a controller 130 on a site 110. DPS 150 can be provided by a server or a group of servers on a location that is within site 110 or remote from the site 110, across the network 180. DPS 150 can be provided by a cloud service or a Software as a Service (SaaS) product or a service.

Data preprocessor 152 can include any combination of hardware and software for preprocessing data. Data preprocessor 152 can provide preprocessing for ESS data 118 (e.g., MEF values 106 and their timestamps 108) and MEF data 104 (e.g., MEF values 106 and their timestamps 108). For example, data preprocessor 152 can normalize ESS values 120 or MEF values 106. Data preprocessor 152 can conform or convert one type or stream of data to a format of another type or stream of data. For example, data preprocessor 152 can reformat MEF data 104 to conform to the format of ESS data 118, and vice versa. Data preprocessor 152 can fill in the gaps within data. For example, when an array or a string of MEF values 106 taken every one hour (e.g., corresponding to timestamps of 1 hour apart) have one or more missing MEF values 102, data preprocessor 152 can fill or determine the missing values based on the surrounding values (e.g., MEF values 106 prior to and following the missing values).

Time aligner 154 can include any hardware or software for aligning two different sets of data. Time aligner 154 can map values of one dataset with a value of another dataset based on the timing of the values. For example, time aligner 154 can align the timestamps 108 of MEF values 106 of a MEF data 104 with the timestamps 108 of ESS values 120 of ESS data 118. Time aligner 154 can work together with the data preprocessor 152 to rearrange data sets (e.g., ESS data 118 or MEF data 104) when they include values taken at different time intervals. For example, time aligner 154 and data preprocessor 152 can preprocess and temporally align ESS values 120 taken at intervals of every five minutes (e.g., ESS values 120 per hour) with MEF values 106 taken every 15 minutes or 30 minutes or every one hour.

Database 156 can include any organized collection of structured information or data stored in memory or storage, such as memory 615 or storage 625. Database 156 can include any format or platform for storing data, such as a file system or tables of information for storing data. Database 156 can store any MEF data 104 or ESS data 118. Database 156 can store MEF values 106 or ESS values 120 either individually or in relation to their corresponding timestamps 108. Database 156 can receive MEF values 106 from utility providers 102 or electricity sources and can receive ESS values 120 from ESSs 116 on sites 110. Database 156 can receive and update its stored data periodically or in real-time and can provide stored data to DPS 150 or its functions, such as the GHG impact function 160, GHG potential function 164 or ESS operation function 176.

GHG impact function 160 can include any function for determining a GHG impact. GHG impact function 160 can include the functionality determine an amount (e.g., weight) of CO2 or CO2 equivalent (gCO2e) corresponding to the site 110. For example, GHG impact function 160 can determine the amount of CO2 equivalent for the electricity consumed or produced by a site 110 over a time period. For example, a GHG impact function 160 can receive MEF data 104 and ESS data 118 from a database 156 or site 110 and use it to establish or determine a GHG impact 162. GHG impact function 160 can use a time aligner 154 to align the timing of the MEF values 106 and ESS values 120 to determine for which time periods the ESS 116 was charging and for which time periods the ESS 116 was discharging. By accounting for the energy provided by ESS 116 during the ESS 116 discharge time, GHG impact function 160 can determine the amount of gCO2e that was offset (e.g., reduced) by the site 110 (e.g., the user) by using the ESS 116 for electricity instead of relying only on the utility provider 102. For example, GHG impact function 160 can associate, map or correspond the MEF values 106 for electricity from the utility provider 102 to MEF values 106 for electricity from the ESS 116. In doing so, the GHG impact function 160 can account for the MEF values of the electricity used to charge the ESS 116 or electricity used to discharge the ESS 116.

In one example, GHG function can use or apply MEF data 104 to determine the GHG impact 162, accounting for any shift in electricity demand, such as shifts in electrical demand from peak to off-peak time using energy stored in the ESS 116. GHG impact 162 can be quantified using any logic or function based on the following Function 1:

Function 1: Determining a GHG Impact 162

$$GHG \text{ Impact } 162 = \sum_{i=1}^{N} (\text{Energy Out}_i - \text{Energy In}_i) \times MEF_i$$

As depicted in illustrative Function 1, the determination for the GHG impact 162 can be based on MEF values 106 timestamped periodically, such as at an hourly basis. Energy Out$_i$ and Energy In$_i$ can represent the energy output of the ESS 116 (e.g., battery discharge) and energy input of the ESS 116 (e.g., battery charge) in kWh and in hourly measurements (e.g., values of i) as aligned with the MEF values 106 for the given time period (e.g., i=1 through i=N). MEF$_i$ can correspond to individual MEF values 106 indicating the marginal emission factor of the time-aligned corresponding electricity per hour i and in terms of gCO2e/kWh. As a result, GHG impact 162 can be provided in gCO2e. In this example, positive GHG Impact 162 can indicate net mitigation while negative can indicate net emission of gCO2.

GHG impact 162 can include any value corresponding to, or identifying, an amount of carbon produced or reduced by a site 110. GHG impact function 160 can determine the GHG impact 162 by subtracting the energy corresponding to MEF values 106 for the time period when the battery (e.g., ESS 116) is discharged from the energy corresponding to the MEF values 106 for the time period when the battery is charged. GHG impact function 160 can determine the GHG impact 162 by subtracting the energy corresponding to MEF values 106 for the time period when the battery (e.g., ESS 116) is charged from the energy corresponding to the MEF values 106 for the time period when the battery is discharged. GHG impact 162 for the site 110 or asset 110 can be determined by subtracting a GHG impact 162 value corresponding to a time period when ESS 116 is being charged from a GHG impact 162 value during a time when battery is being discharged. The resulting GHG impact 162 for the asset 110 can correspond to a net difference of the two GHG impacts 162.

GHG potential function 164 can include any function for determining a potential to reduce the amount of GHG produced by a site 110. GHG potential function 164 can include the functionality determine an amount (e.g., weight) of CO2 or CO2 equivalent (gCO2e) corresponding to the site 110. For example, GHG impact function 160 can determine the amount of CO2 equivalent for the electricity that the site 110 can achieve if it aligns it maximizes its ESS 116 utilization in accordance with MEF data 104, so as to charge the ESS 116 when MEF data 104 is at its lowest and discharge the ESS 116 (e.g., power the energy loads or devices) when MEF data 104 is at its highest. GHG potential function 164 can provide or determine the maximum amount of GHG mitigation that the site 110 can provide given the MEF data 104. GHG potential function 164 can provide an output of its determination (e.g., GHG potential offset 166).

To increase, improve, or maximize the GHG mitigation by a site 110, the MEF 104 data can include MEF values 106 corresponding to one or fuller charge/discharge cycles of the ESS 116. MEF data 104 can cover a time period of, for example, one or more hours, one or more days or weeks. MEF data 104 can include or reflect changes in values corresponding to demand shift responses by the utility provider 102. During the time period covered by the MEF data 104, the ESS 116 can be discharged (e.g., partially or fully) when MEF values 106 are at their maximum value(s) (e.g., mitigating the GHG emissions) whereas the ESS 116 can be charged (e.g., partially or fully) when MEF values 106 are their minimum (e.g., emitting GHGs). To identify the time intervals with a positive grid GHG mitigation potential, a modified daily MEF gradient can be defined in accordance with the following Function 2:

Function 2: Determining a GHG Potential Offset 166

$$GHG \text{ Potential Offset } 166 = \Delta_m = (MEF_{max_i} \times RTE) - MEF_{min_i}$$

As depicted in illustrative Function 2 above, $MEF_{max_i}$ and $MEF_{min_i}$ can represent maximum and minimum MEF values 116 in each time period that the MEF data 104 covers (e.g., a day or a week). The $MEF_{max_i}$ and $MEF_{min_i}$ be expressed in gCO2e/kWh. The RTE in the Function 2 can represent the round trip efficiency of the ESS 116 (e.g., energy loss 178). The energy loss 178 can be assigned a value, such as 85% to be multiplied by the $MEF_{max_i}$.

For example, GHG potential offset 166 can correspond to a group of MEF values 106 within a particular time interval (e.g., multiple hours) for which the mean or average of a subset of MEF values 106 over the time interval reach a maximum and a group of MEF values 106 within a second time interval (e.g., multiple hours) for which the mean or average of the second subset of the MEF values 106 reaches a minimum. The average or mean values of the two subsets can be subtracted by the GHG potential function 164 to provide a GHG potential offset 166 for the site 110 over a greater time period (e.g., two time intervals of multiple hours).

GHG potential function 164 can determine and provide a GHG mitigation determination (e.g., GHG potential offset 166) for a longer time period covering a plurality of ESS 116 charge/discharge cycles. For example, GHG potential function 164 can generate a GHG potential offset 166 for an annual GHG mitigation in gCO2e of the site 110, which can be expressed in accordance with the following Function 3:

Function 3: Determining annual GHG Potential Offset

GHG Potential Offset 166 (annual) =

$$\sum \Delta_m \times kWh = \sum_{i=1}^{N} \left( MEF_{max_i} \times RTE \right) - MEF_{min_i}$$

As depicted in illustrative Function 3 above, Function 3 can be presented in the units kWh, corresponding to the energy capacity of the ESS 116, while the $\Delta_m$ can correspond to a modified periodic (e.g., daily) MEF gradient and can be expressed in gCO2e/kWh. Accordingly, GHG potential offset 166 can correspond to any amount of gCO2e that can be mitigated (e.g., reduced or offset) from the baseline (e.g., utilization of the electricity from the utility provider 102 without usage of ESS 116) over any time period (e.g., a day, a week, a month or one or more years).

Energy loss monitor 168 can include any function for monitoring data and determining an energy loss 178. Energy loss 178 can be referred to, or expressed as the round trip efficiency, and can correspond to a number between 0 and 1 indicating the amount of energy lost during the charge/discharge cycle of the ESS 116. For example, energy loss monitor 168 can utilize data from the ESS monitor 134 as well as data about energy losses associated with power losses on the utility grid 202 (e.g., information from the utility provider 102) to determine the amount of energy that is lost during the charge or discharge of the ESS 116. Energy loss monitor 168 can monitor and account for electricity distribution inefficiencies via power lines 138 or any infrastructure on the utility grid 202 or local grid 204. Energy loss monitor 168 can receive data from the ESS monitor 134 and utilize it to determine the energy loss 178. Energy loss monitor 168 can receive the energy loss 178 value as an external input (e.g., operator input into the system) and use the input energy loss 178 to offset the MEF value(s) 106 corresponding to the maximum GHG while determining the GHG potential offset 166.

MEF forecaster 170 can include any function for forecasting, predicting or otherwise determining predicted MEF data 172. Predicted MEF data 172 can correspond to any MEF data 104 predicted for a future time interval. Predicted MEF data 174 can include predicted MEF values 174 corresponding to MEF at future time points or intervals, as indicated by timestamps 108 corresponding to the predicted MEF values 174. Predicted MEF data 172 can include any features or characteristics of MEF data 104, including any features or characteristics of any MEF values 106 (e.g., forecasted MEF values 174) and the corresponding timestamps 108. Predicted MEF data 172 can include predicted MEF values 174 determined for a future time interval, such as a next day, a next week, a next month or a next year. MEF forecaster 170 can predict or forecast the predicted MEF data 172 based on prior MEF data 104.

MEF forecaster 170 can predict or forecast (e.g., determine) the predicted MEF data 172 based on prior cycles of MEF data 104 as a function of hours in a day, days in a month, day or night, weather patterns, environment daily temperature and similar data. For example, MEF forecaster 170 can determine that MEF data 104 for certain time of the year (e.g., certain weeks or months) is higher than other times in the year. In response to this determination, MEF forecaster 170 can generate predicted MEF data 172 to have predicted MEF values 174 for such certain time of the year to be as high as it was in the MEF data 104 and to have MEF values 174 for other times of the year lower (e.g., as was the case in the MEF data 104).

MEF forecaster 170 can generate predicted MEF data 172 based on usage profile of the site 110 or the region in which the site 110 is located. For example, MEF forecaster 170 can generate predicted MEF data 172 for a site 110 that is a hospital based on MEF data 104 of another site 110 that is also a hospital within the general region or area. For example, MEF forecaster 170 can generate predicted MEF data 172 for a site 110 that is a factory based on MEF data 104 of another site 110 that is a factory of the similar kind. For example, MEF forecaster 170 can generate predicted MEF data 172 based on prior MEF data 104 corresponding to the same utility provider 102 in the same or a similar area.

Timestamps 108 can correspond to any data or metadata identifying a date or time, or a time period, corresponding to a data value or a measurement. For example, timestamp 108 can include data or metadata identifying time and day corresponding to a value. For example, timestamp 108 can include a time range corresponding to one or more minutes, hours or days. Timestamp 108 can include any combination of a second, a minute, an hour, a day, a month or a year in the context of a point in time or a time range. Timestamp 108 can be associated with any value (e.g., MEF value 106, ESS value 120 or predicted MEF value 174).

ESS operation function 176 can include any combination of hardware and software for determining operation of ESS 116. ESS operation function 176 can determine operating parameters 132 for ESS 116 based on, or using, MEF data 104 or predicted MEF data 172. For example, ESS operation function 176 can utilize MEF data 104 or predicted MEF data 172 to determine a time period during which MEF values 106 or predicted MEF values 174 are the highest (e.g., above a threshold, such as at 90% of the maximum value or above) within a time period. For example, ESS operation function 176 can utilize MEF data 104 or predicted MEF data 172 to determine a time period during which MEF values 106 or predicted MEF values 174 are the lowest (e.g., below a threshold, such as at 10% above the minimum value or below) within a time period. ESS operation function 176 can determine, based on MEF values 106 or predicted MEF values 174 and their corresponding timestamps 108, a time period during which to charge or discharge ESS 116 for a maximum impact on GHG mitigation (e.g., reduction of GHG). For example, ESS operation function 176 can identify, based on time duration it takes for ESS 116 to fully charge, a time interval during which predicted MEF values 174 are lowest and determine the charge time for the ESS 116. For example, ESS operation function 176 can identify, based on time duration it takes for ESS 116 to fully discharge, a time interval during which predicted MEF values 174 are highest and determine the discharge time for the ESS 116.

ESS operation function 176 can provide its output in terms of the operating parameters 132. For example, ESS operation function 176 can identify the charge time and charge durations as well as discharge time and discharge durations for the ESS 116 and can generate the operating parameters 132 to implement the established charge time and durations and discharge time and durations for the ESS 116. For example, ESS operation function 176 can generate operating parameters 132 to schedule charging and discharging of the ESS 116 according to the determined charge and discharge timing for minimizing GHG impact at the site 110. ESS operation function 176 can modify the operating parameters 132 to account of energy utilization preferences of the site (e.g., highest or lowest energy usage) which can offset the timing of the charging or discharging by some time amount.

ESS operation function 176 can include the functionality for determining the timing to charge the battery and discharge the battery based on MEF values 106. For example, GHG potential function 164 can determine a discharge period for the ESS 116 (e.g., the timing to start and end the discharge of the battery) based on a timestamps 108 corresponding to MEF values 106, which when adjusted for the energy loss 178, exceed a threshold. The threshold can be any value between the maximum MEF value 106 and the minimum MEF value 106 in the MEF data set 104. For example, the threshold can at least 95%, 90%, 85%, 80%, 75%, 70%, 65%, 60%, 55% or 50% of the maximum MEF Value 106 or the difference between the maximum MEF value 106 and the minimum MEF value 106 in the MEF data 104.

ESS operation function 176 can determine a charge period to charge the ESS 116 (e.g., timing to start and end charging of the battery) based on a second time interval for which a second subset of MEF values 106 of the plurality of MEF values 106 remains below the threshold. The threshold can be any value between the minimum MEF value 106 and the maximum MEF value 106 in the MEF data set 104. For example, the threshold can at least 5%, 10%, 15%, 20%, 25%, 30%, 35%, 40%, 45% or 50% of the minimum MEF value 106 added to the MEF value 106 or that percentage amount corresponding to the difference between the maximum MEF value 106 and the minimum MEF value 106 in the MEF data 104. For example, the threshold can be a single threshold for both the upper side (e.g., towards the maximum MEF value 106) and the lower side (e.g. the minimum MEF value 106), such as a median or an average of the entire MEF data set 104.

Functions of the DPS 150, including ESS operation function 176, GHG impact function 160, GHG potential function 164 and the MEF forecaster 170 can each include and utilize machine learning (ML) to determine their results, including for example the forecast MEF data 172, operating parameters 132 and mitigated GHG impacts 184. Functions of the DPS 150 can include machine learning scripts, code or sets of instructions or any other AI or ML related functionality to make determinations, predictions or forecasts or make determinations using forecast data (e.g., forecast MEF data 172). DPS 150 functions (e.g., ESS operation function 176, GHG impact function 160, GHG potential function 164 and MEF forecaster 170) can include one or more Similarity and Pareto search functions, Bayesian optimization functions, neural network-based functions or any other optimization functions or approaches. DPS 150 functions can include an artificial neural network (ANN) function or a model, including any mathematical model composed of several interconnected processing neurons that can operate as units. The neurons and their corresponding connections can be trained using prior data (e.g., historical MEF data 104, ESS data 118 or similar) and any other data or information discussed herein. The neurons and their connections can represent the relations between inputs and outputs. Inputs and outputs can be represented with or without the knowledge of the exact information of the system model. For example, ML or AI models can be trained by a model trainer using neuron by neuron (NBN) algorithm.

ESS operation function 176 can determine a mitigated GHG impact 184 of a site 110 in which operating parameters 132 (e.g., settings) can be applied to control the operation ESS 116 to align the ESS 116 operation with MEF data 104 characteristics described in Functions 2 and 3. For example, in order to improve (e.g., mitigate or reduce) the GHG impact of a site 110, the operation of the ESS 116 can be configured, adjusted or controlled using operating parameters 132 (e.g., settings) for the ESS 116 to fully or partially align the operation (e.g., the timing of the battery charge or discharge) of the ESS 116 with the characteristics (e.g., increases or decreases, periodic or local maximums/peaks or minimums/valleys) of the MEF data 104. For example, the operating parameters 132 can make the operation of ESS 116 become more aligned with the characteristics described in Functions 2 and 3. This alignment in the operation can be provided or represented by a value, such as the value $\alpha$ in the Function 4 below. For example, the ESS operation function 176 can provide a mitigated GHG impact 184 for a site 110 based on partially or fully aligning the ESS 116 operation of the ESS 116 with the GHG potential offset 166 as expressed in Functions 2 and 3 above, using the following Function 4:

Function 4: Determining mitigated GHG impact 184

$$\text{Mitigated } GHG \text{ Impact } 184 = \text{kWh} \times \sum \Delta_m \times \alpha$$

As depicted in illustrative Function 4 above, Function 4 can be presented in the units kWh, corresponding to the energy capacity of the ESS 116, while the $\Delta_m$ can correspond to a modified periodic (e.g., daily, monthly or annual) GHG Potential offset 166, which can be expressed in gCO2e/kWh. Accordingly, the mitigated GHG impact 184 can be determined as an amount of gCO2e or gCO2e/kWh and can correspond to the GHG potential offset 166 as a function of the value $\alpha$ that can correspond to the alignment between the GHG potential offset 166 and the mitigated GHG impact 184. For example, a maximized mitigated GHG impact 184, corresponding to minimized GHG emission by the site 110, can be achieved when the ESS 116 is fully aligned with the GHG potential offset 166. For example, mitigated GHG impact 184 can correspond to less reduced GHG emission by the site 110 when ESS 116 is not fully aligned with the GHG potential offset 166. In order to determine the mitigated GHG impact 184, the DPS 150 can utilize the forecast MEF data 172 to predict the future characteristics (e.g., changes, increases and decreases) of the MEF data.

In some aspects, the present solution utilizes real-time and forecasted GHG data 172 to act as an input to improve energy storage while reducing GHG emissions in grid-responsive assets 110. The present solution can utilize MEF data 104 which can allow the DPS 150 to monitor and track GHG emissions from sites 110 in various sites 110. The present solution can utilize this functionality to more accurately target the most polluting hours of electricity generation (e.g., when MEF values 106 are at their highest) to provide electricity from the ESS 116 and charge the ESS 116 when the pollution associated with electricity generation is reduced (e.g., MEF values 106 are at their lowest) for the given charge and discharge time period (e.g., a day). Using functionalities of the DPS 150, the DPS can quantify the GHG impacts of a site for energy per hour for each time period, such as a day.

The present solution can allow for mitigating GHG emissions and producing carbon credits, which can allow sites 110 to emit a certain amount of GHG. The present solution can use MEF data 104 that can correspond to real-time intensity of the electricity grid as an input, rather than being an output of operations retroactively. The present solution can maximize the environmental impacts of deployed energy storage and demand responsive solutions.

The present solution can allow for optimization of the site 110 in terms of its reduction of GHG output. For example, an ESS operation function 176 of the DPS 150 can determine a coefficient, $\alpha$, for a known ESS 116 that describes the determined GHG mitigation using operational performance data (e.g., operational parameters 132) for that ESS 116. The ESS operation function 176 can then apply the determined $\alpha$ value to a new ESS 116 in the same or a different site 110 where anticipated operational activity (e.g., MEF data 104 or ESS 116 operation) in a new site 110 is similar to the known ESS 110.

The ESS operation function 176 can determine the coefficient $\alpha$ for a known one or more sites 110. For example, the ESS operation function 176 can determine the GHG potential offset 166 (e.g., the annual maximum GHG mitigation potential), which can be expressed in terms of MT CO2e for each known site 110. For each day in the year, the GHG mitigation potential of an ESS site, given one cycle per day, can be equal to the difference between fully discharging the ESS 116 when the MEF values 116 are at their maximum (e.g., mitigating GHG emissions) and fully charging the ESS 116 when MEF values 116 are their minimum (e.g., emitting reduced GHG emission). By accounting for this process for all of the days of the year, the ESS operation function 176 can determine a mitigation potential the year (e.g., the annual GHG potential offset 166), which can be determined using Function 5 as follows:

Function 5: Determining annual GHG Potential Offset 166

GHG Potential Offset 166 (annual) =

$$\sum \left[ \left( MEF_{max_i} \times kWh \times RTE \right) - \left( MEF_{min_i} \times kWh \right) \right] \times 10^{-6}$$

As depicted in illustrative Function 5 above, the ESS operation function 176 can express the annual GHG potential offset 166 in the units of mega-tons (MT) of CO2, where kWh can correspond to the energy capacity of the site 110 and the RTE can correspond to the Energy loss 178. The annual potential offset 166 can correspond to the theoretical maximum GHG mitigation potential of demand shifting in a utility grid 202 on the basis of daily demand shifts, resulting in an overall reduced GHG emissions for the year. The annual GHG potential offset 166 can correspond to the difference between the MEF maximum and minimum in the periodic (e.g., daily) charge and discharge time periods when accumulated over the year.

The ESS operation function 176 can factor out the kWh from the Function 5 above, and utilize Function 6 as follows:

Function 6: Determining annual HG Potential Offset 166 expressed with kWh factored out GHG Potential Offset 166 (annual) =

$$kWh \times \sum \left[ \left( MEF_{max_i} \times RTE \right) - \left( MEF_{min_i} \right) \right] \times 10^{-6}$$

As depicted in illustrative Function 6 above, the ESS operation function 176 can determine the GHG potential offset 166 with kWh units factored outside of the function. For example, the ESS operation function 176 can express the above Function 6 in terms of the annual modified MEF gradient, as shown in Function 7 below:

Function 7: Annual GHG Potential Offset 166 expressed as annual modified MEF gradient Annual Modified MEF Gradient = $\qquad$ Eq.3

$$\Delta_m = \sum \left[ \left( MEF_{max_i} \times RTE \right) - MEF_{min_i} \right] \times 10^{-6}$$

As depicted in illustrative Function 7 above, the ESS operation function 176 can determine an annual modified MEF gradient, $\Delta_m$, from the GHG potential offset 166 expressed with kWh factored out. The same or a similar Function 7 can be used to determine a modified MEF gradient for any time period, such as a week, a month, or multiple months or years.

The ESS operation function 176 can determine a value or a coefficient alpha ($\alpha$), representing the operational characteristics of a site 110 (charging/discharging behavior) in the specific electricity grid (e.g., 204) and specific (e.g., matching) MEF data of the same or a different utility provider 102 providing electricity to another site 110. The ESS operation function 176 can determine the value $\alpha$ in terms of the metric tons (MT) of CO2e per mega-watt (MW) of capacity using the $\Delta_m$ of Function 7 as shown in Function 8 below:

Function 8: Value $\alpha$ determined using annual modified MEF gradient corresponding to the annual GHG potential offset 166

Metric tons of CO2e per MW of capacity = $\Delta_m \times \alpha$ $$\alpha = \frac{\text{Metric tons of CO2e per MW of capacity}}{\Delta_m}$$

As shown in the illustrative Function 8 above, the ESS operation function 176 can determine the coefficient alpha using the annual modified MEF gradient. Upon determining the $\alpha$ value using, for example, Function 8, the ESS operation function 176 can apply the coefficient $\alpha$ to new sites 110. For example, the ESS operation function 176 can use for the new sites 110 a median or an average $\alpha$ value from another one or more known sites 110 that have similar characteristics (e.g., a same or similar utility provider 102, electricity sources 140, region or type of a site 110). For example, the ESS operation function 176 can determine a value α for a site 110 based on independent system operator (ISO) or independent electricity system operator (IESO) for a region. For example, the coefficient α can be determined based on IESO and ISOs, such as California ISO (CAISO) or New York ISO (NYISO). The ESS operation function 176 can determine α coefficient by splitting values corresponding to IESO and country or regional ISOs, as shown in Table 1 below:

TABLE 1

Initial coefficient α based on ISO and IESO data

| New Site ISO | Coefficient α |
| --- | --- |
| PJM | 50% NYISO, 50% IESO |
| ISONE | 30% NYISO, 70% IESO |
| Germany | 50% NYISO, 50% CAISO |
| Japan | 80% IESO, 20% CAISO |

As shown in the illustrative Table 1 above, the ESS operation function 176 can determine the alpha coefficient for any number of ISO or IESO entities utilizing data of such entities and finding weight ratio for each entity.

The ESS operation function 176 can determine the forecasted Estimated Annual GHG Mitigation (MTCO2e) by multiplying the Project MW by $\Delta_m$ from Function 7 and α from Function 8. The resulting annual estimated mitigated GHG impact 184 by a new site can be expressed in Function 9, as follows:

Function 9: annual estimated mitigated $GHG$ impact 184 for a site 110

Mitigated $GHG$ Impact 184 = Projected MW × $\Delta_m$ × α

As shown in the illustrative Function 9 above, the ESS operation function 176 can determine an annual estimated mitigated GHG impact 184. The annual estimated mitigated GHG impact 184 can be a projected GHG impact based on operational parameters 132 (e.g., settings) for operating ESS 116 of the new site. Using Function 9, the ESS operation function 176 can allow determine the annual GHG mitigation in terms of MT of CO2e for a site 110. Determined mitigated GHG impact 184 can be forward looking and be based on forecast MEF data 172. Mitigated GHG impact 184 can be determined for each ISO or IESO, as shown in Table 2, below:

TABLE 2

Mitigated GHG impact 184 per ISO or IESO

| New ISO | Mitigated GHG impact 184 | $\Delta_m$ | α |
| --- | --- | --- | --- |
| PJM | PJM | PJM | 50% NYISO, 50% IESO |
| ISONE | ISONE | ISONE | 30% NYISO, 70% IESO |
| Germany | Germany | Germany | 50% NYISO, 50% CAISO |
| Japan | Japan | IESO | 80% IESO, 20% CAISO |

As shown in the illustrative Table 2 above, the ESS operation function 176 can determine mitigated GHG impact 184 for any number of ISO or IESO entities. Once the ESS operation function 176 determines the α coefficients for all MEFs (e.g., per table 2 above), determining projected mitigated GHG impact 184 (e.g., projected minimized GHG) for a site can be determined using the Function 10, as shown below:

Function 10: projected mitigated $GHG$ impact 184 for a site 110

Mitigated $GHG$ Impact 184 (gCO2) = energy (kW) ∗ time (hour) ∗ α (gCO2/kWh)

As shown in the illustrative Function 10 above, the ESS operation function 176 can determine a mitigated GHG impact 184 for a particular new site or asset 110. The ESS operation function 176 can utilize Function 10 to project mitigated GHG impact 184 for one or more sites based on, or according to, information from ESS data 118 and MEF data 104 corresponding to other sites 110. The ESS function 176 can reduce or minimize the cost along with reducing or minimizing GHG (gCO2e) emission simultaneously in accordance with any objective of the site 110. For example, in a multi-objective solution, the ESS operation function 176 can reduce the GHG emission as well as time the ESS 116 operation based on costs, thereby finding an α coefficient that both reduces GHG emission and increases energy cost savings.

Figure 2:
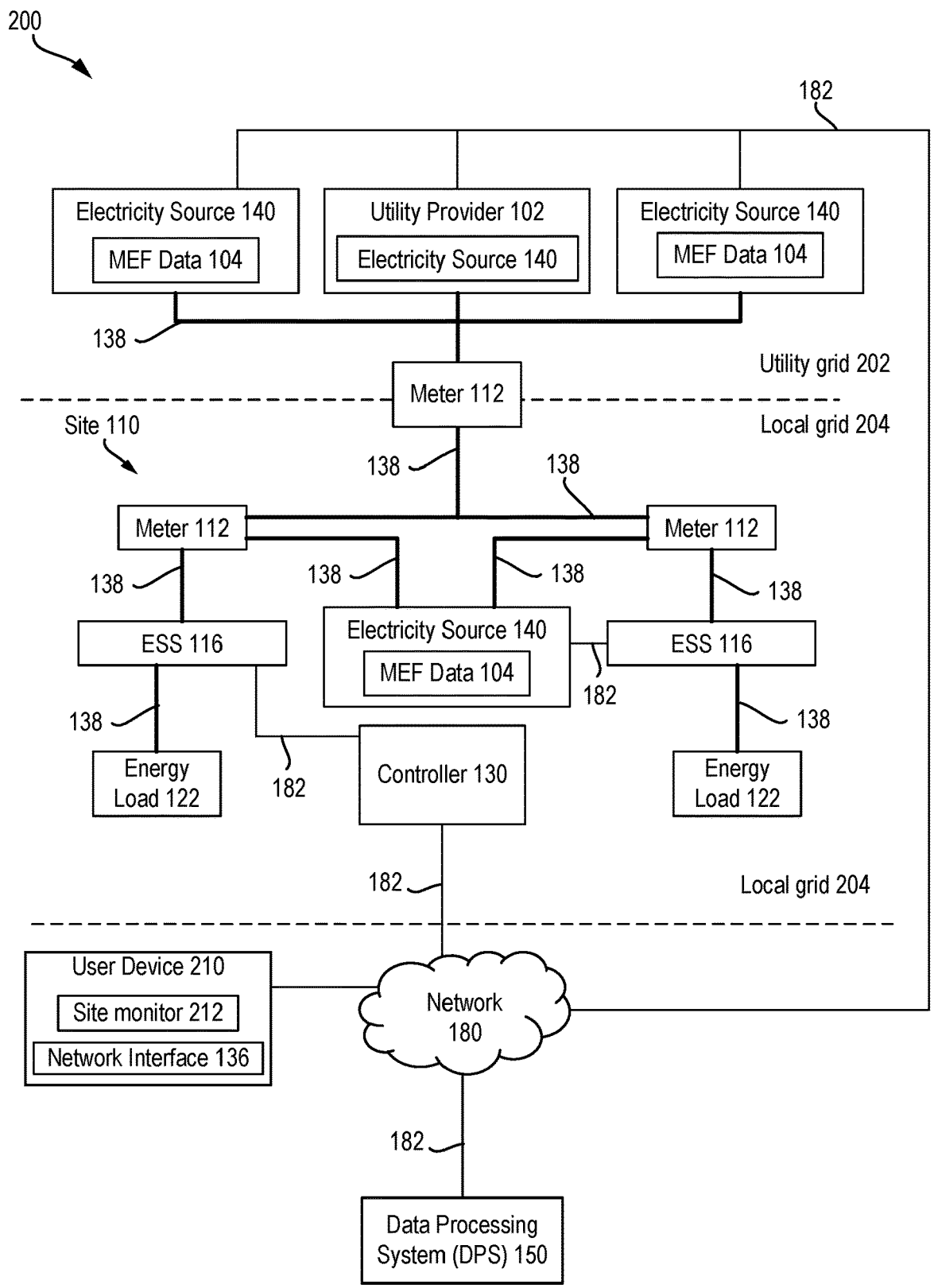
FIG. 2 illustrates an example system to monitor and manage GHG emissions of an asset monitored by a user device by using MEF data to operate the energy storage system of the asset.

FIG. 2 illustrates an example of a system 200 for using MEF data to determine a GHG impact associated with a customer site, determine a potential to reduce the GHG impact and generate parameters for operating ESS 116 to reduce the GHG impact at the site 110. The example system 200 can include or relate to example system 100 and can include multiple electricity sources 140 with own MEF data 104 providing electricity via power lines 138 to a utility provider 102. Utility provider 102 can include a utility source 140 of its own and can generate MEF data 104 corresponding to all electricity from all electricity sources 140 (e.g., internal or external to the utility provider 102). Utility provider 102 can provide electricity over a utility grid 202 to a utility meter 112 of the site 110.

Once passing via the meter 112 (e.g., the utility meter of the site 110), the electricity can be distributed, via the local grid, to various internal meters 112 (e.g., sub-meters of the site 110), ESSs 116 and energy loads 122. Site 110 can also include one or more electricity sources 140 (e.g., solar farm or wind turbines) having MEF data 104 corresponding to the internal electricity source 140. Meters 112 (e.g., sub-meters) can receive electricity from the meter 112 (e.g., utility meter) via power lines 138 and can measure or monitor energy consumption and throughput to and from electricity source(s) 140, ESSs 116 and energy loads 122. Controller 130 can include a communication link or connection with ESS 116 to provide operational parameters 132. Electricity source 140 internal to the site 110 can be in communication with ESS 116 as well as external electricity sources 140 or the utility provider 102.

Electricity sources 140, utility provider 102 and devices on the site 110 (e.g., controller 130, ESS 116 and meters 112) can communicate with DPS 150 and a user device 210 via a network 180. DPS 150 can be deployed at a cloud or a virtual private network (VPN). User device 210 can include a site monitor 212 and a network interface 136 to communicate with the DPS 150.

Utility grid 202 can include an interconnected network for electricity delivery from producers of electricity to the consumers of electricity. Utility grid 202 can include power stations, electrical substations, transformers and electric power transmission and distribution lines (e.g., power lines 138). Utility grid 202 can include electricity synchronized in three phase alternating current (AC) frequencies and can connect to a large number of electricity generators, substations and consumers. Utility grid 202 can include a commercial electric power distribution system that takes electricity from a generator and transmits it over a distance to the consumer. The consumer can receive the electricity from the utility grid 202 via a utility meter 112, such as via an electrical connection to which utility meter 112 is connected or of which it is a part.

Local grid 204 can include any electrical distribution system or network at a site 110 to allow one or more end users or consumers to connect and use their electrical and electronic devices (e.g., energy loads 122). For example, a local grid 204 can include an interconnected network of electrical sockets, electrical wiring or conduits, power stations or substations, transformers, electricity generating devices and electricity consuming devices that can be connected to each outer and to the utility grid 202, via a utility meter 112. Local grid 204 can provide electrical distribution for energy generating devices, such as solar panels or wind turbines and can connect such devices to ESSs 116. For example, energy generating devices can be used to charge ESSs 116 via the local grid 204. The ESSs 116 can be charged via meter 112 from utility provider 102 or a local ESS 116. Local grid 204 can provide electrical distribution for electricity consuming devices that can consume the amount of electricity and which can be generally referred to as energy load 122. The local grid 204 can receive electrical utility via a utility distribution grid 202 from a utility provider 102 and can export electrical utility to the utility distribution grid 202 and to the utility provider 102.

User device 210 can include any device that can be utilized by a user monitoring GHG data for a site 110. User device 210 can include any computer, laptop, smartphone or any other device capable of network communication via network 180. User device can include a display for displaying data to the user, such as GHG impact 162 of the site, GHG potential offset 166 of the site, energy loss 178 associated with the site 110 and operating parameters 132.

User device can utilize a site monitor 212 that can include an application or a function to allow the user to monitor GHG data for the site. Site monitor 212 can include an application, a function, for example a web page, allowing the user to review GHG related data for the site. For example, site monitor 212 can include or provide a graphical user interface to display to the user GHG data of the site 110, such as GHG impact 162 of the site, GHG potential offset 166 of the site, energy loss 178 associated with the site 110 and operating parameters 132. Site monitor 212 can include a prompt for the user to enter input for the DPS 150, such as for example energy loss 178 for the energy loss monitor 168 or site preferences with respect to time periods within which to charge and discharge ESSs 116. DPS 150 can utilize the preferences input by the user to offset, modify or determine the operational parameters 132 in accordance with the user preference with respect to the timing, duration and rate of charge or discharge time of the ESS 116.

For example, the present disclosure can relate to a system for utilizing MEF to establish, monitor and adjust GHG impact of a site or an asset 110. The system can correspond to example system 100 or an example system 200. The system can determine a value corresponding to an amount of GHG (e.g., GHG impact 162) associated with asset 110. The system can include one or more processors (e.g., 610) coupled with memory (e.g., 615 or 625). For example, a processor 610 can identify a first data set (e.g, MEF data 104). The first data set can include a plurality of MEF values 106 corresponding to MEF of electricity provided by a utility provider 102 of the electricity over a time period (e.g., one or more days, weeks or months). Processor 610 can identify a second data set (e.g., ESS data 118). The second data set can include a plurality of measurements (e.g., ESS values 120) corresponding to power of a battery of the ESS 116 of an asset 110 that can be coupled with the utility provider 102 of electricity over the time period. Processor 610 can determine a plurality of MEF values 106 corresponding to use of the battery (e.g., ESS 116) based on the plurality of values (e.g., MEF values 106) and the plurality of measurements (e.g., ESS values 120) over the time period. Processor 610 can determine or generate a value corresponding to an amount of carbon associated with the asset 110 using the battery (e.g., ESS 116) over the time period and based on the plurality of MEF values 106.

Processor 610 can be configured to receive a first MEF value 106 of the plurality of MEF values 106 corresponding to MEF data 104 from a first electricity source 140 associated with the utility provider 102 of electricity and a second MEF value 116 of the plurality of values MEF 106 corresponding to MEF data 104 from a second electricity source 140 associated with the utility provider 102. Processor 610 can be configured to modify at least the first MEF value 106 value and generate the first data set (e.g., MEF data 104) to include the modified first MEF value 106 and the second MEF value 106.

Processor 610 can be configured to identify, for a first MEF value 106 of the first data set (e.g., MEF data 104) received from a first device (e.g., a server of an electricity source 140 or utility provider 102) on a utility grid 202, a first timestamp 108 corresponding to the first MEF value 106. Processor 610 can be configured to identify, for a second MEF value 106 of the first data set (e.g., MEF data 104) received from a second device (e.g., a server of an electricity source 140 or utility provider 102) on the electrical grid, a second timestamp 108 corresponding to the second MEF value 106. Processor 610 can be configured to generate the first data set to include the first MEF value 106 arranged in an order of the plurality of MEF values 106 of the first data set (e.g., MEF data 104) according to the first timestamp 108 and the second MEF value 106 arranged in the order according to the second timestamp 108. For example, the order can be determined based on the time identified in the two timestamps 108. For example, the first MEF value 106 can correspond to a timestamp 108 identifying an earlier time than the time identified in the timestamp 108 corresponding to the second MEF value 106.

Processor 610 can be configured to receive the plurality of measurements (e.g., ESS values 120) from a meter 112 coupled with the battery (e.g., ESS 116). The plurality of measurements (e.g., ESS values 120) can correspond to a plurality of timestamps 108. Processor 610 can be configured to identify, based on the plurality of measurements (e.g., ESS values 120) and the plurality of timestamps 108, a first portion of the time period in which the battery (e.g., ESS 116) was charged and a second portion of the time period in which the battery (e.g., ESS 116) was discharged.

Processor 610 can be configured to identify, from the plurality of measurements (e.g., ESS values 120) received from a meter 112 coupled with the battery (e.g., ESS 116), a first subset of the plurality of measurements (e.g., ESS values 120) corresponding to a first portion of the time period during which the battery (e.g., ESS 116) is charged from the utility provider 102 of electricity on an electrical grid (e.g., utility grid 202). Processor 610 can identify, from the plurality of measurements (e.g., ESS values 120), a second subset of the plurality of measurements (e.g., ESS values 120) corresponding to a second portion of the time period during which the battery (e.g., ESS 116) is discharged to an energy load 122 on a local grid 204 separated from the electrical grid 202 by the meter 112.

Processor 610 can be configured to identify, using a plurality of timestamps 108 corresponding to the plurality of measurements (e.g., ESS values 120), a first portion of the time period during which the battery (e.g., ESS 116) is charged and a second portion of the time period during which the battery (e.g., ESS 116) is discharged. Processor 610 can be configured to determine a first subset of the plurality of MEF values 106 corresponding to the first portion of the time period during which the battery (e.g., ESS 116) is charged and the second subset of the plurality of MEF values 106 corresponding to the second portion of the time period during which the battery (e.g., ESS 116) is charged.

Processor 610 can be configured to receive, from a sensor 114, the plurality of measurements (e.g., ESS values 120) including a first measurement (e.g., ESS value 120) corresponding to electricity charged to the battery (e.g., ESS 116) corresponding to a first timestamp 108 and a second measurement (e.g., ESS value 120) corresponding to electricity discharged from the battery (e.g., ESS 116) corresponding to a second timestamp 108. Processor 610 can be configured to identify a plurality of timestamps 108 associated with the plurality of values (e.g., 106) corresponding to MEF during the time period, the plurality of values comprising a first MEF value 106 corresponding to a third timestamp 108 and a second MEF value 106 corresponding to a fourth timestamp 108. Processor 610 can be configured to determine that the first MEF value 106 corresponds to a first portion of the time period corresponding to the battery (e.g., ESS 116) discharging based on a match between the first timestamp 108 of the first measurement (e.g., ESS value 120) and third timestamp 108 of the first value (e.g., ESS value 120). Processor 610 can be configured to determine that the second MEF value 106 corresponds to a second portion of the time period corresponding to the battery (e.g., ESS 116) charging based on a match between the second timestamp 108 of the second measurement (e.g., ESS value 120) and fourth timestamp 108 of the second MEF value 106.

Processor 610 can be configured to generate the value corresponding to the amount of carbon associated with the asset 110 according to a difference between a first subset of the plurality of MEF values 106 corresponding to a first portion of the time period when the battery (e.g., ESS 116) is discharged and a second subset of the plurality of MEF values 106 corresponding to a second portion of the time period when the battery (e.g., ESS 116) is charged.

Processor 610 can be configured to determine, using a first timestamp 108 corresponding to a first MEF value 106 of the plurality of MEF values 106 and a second timestamp 108 of a first measurement (e.g., ESS value 120) of the plurality of measurements (e.g., ESS values 120), a first value corresponding to a first amount of carbon (e.g., GHG impact 162 when the MEF data 104 is at its peak of the ESS 116 equivalent charge/discharge cycle) corresponding to a first portion of the time interval during which the battery (e.g., ESS 116) is discharged. Processor 610 can be configured to determine, using a third timestamp 108 corresponding to a second MEF value 106 of the plurality of values and a fourth timestamp 108 corresponding to a second measurement (e.g., ESS value 120) of the plurality of measurements, a second value corresponding to a second amount of carbon (e.g., GHG impact 162 when the MEF data 104 is at its valley or minimum of the ESS 116 equivalent charge/discharge cycle) corresponding to a second portion of the time interval during which the battery (e.g., ESS 116) is charged. Processor 610 can be configured to generate the value corresponding to the amount of carbon (e.g., GHG impact 162) according to a difference between the first value corresponding to the first amount of carbon (e.g., GHG impact 162) and the second value corresponding to the second amount of carbon (e.g., GHG impact 162).

For example, the present disclosure can relate to a non-transitory computer-readable medium having processor readable instructions. The instructions can be stored in memory (e.g., 615, 620 or 625). The instructions can be such that, when executed, cause one or more processors 610 to identify a first data set (e.g., MEF data 104) comprising a plurality of MEF values 106 corresponding to marginal emission factor (MEF) of electricity provided by a utility provider 102 of electricity over a time period. The instructions can cause one or more processors 610 to identify a second data set (e.g., ESS data 118) comprising a plurality of measurements (e.g., ESS values 120) corresponding to power of a battery (e.g., ESS 116) of an asset 110 coupled with the utility provider 102 of electricity over the time period. The instructions can cause one or more processors 610 to determine a plurality of MEF values 106 corresponding to use of the battery (e.g., ESS 116) based on the plurality of MEF values 106 and the plurality of measurements (e.g., ESS values 120 over the time period. The instructions can cause one or more processors 610 to generate a value corresponding to an amount of carbon (e.g., GHG impact 162) associated with the asset using the battery over the time period and based on the plurality of MEF values 106.

The instruction can cause one or more processors 610 to receive a first MEF value 106 of the plurality of MEF values 106 corresponding to MEF from a first electricity source 140 associated with the utility provider 102 of electricity and a second value of the plurality of MEF values 106 corresponding to MEF from a second electricity source 140 associated with the utility provider of electricity. The instructions can cause the one or more processor 610 to modify at least the first MEF value 106 and generate the first data set (e.g., MEF data 104) to include the modified first MEF value 106 and the second MEF value 106.

The present disclosure can relate to a system 100 or 200 for determining a greenhouse gas (GHG) mitigation potential of an asset or site 110. The system can include a data processing system 150 having one or more processors 610. A processor 610 of the data processing system 150 can receive a plurality of MEF values 106 indicative of a marginal emission factor (MEF) of electricity provided by a utility provider 102 of electricity coupled with a battery (e.g., ESS 116). The processor 610 of the DPS 150 can identify, within a subset of the plurality of MEF values 106, a highest value of the plurality of MEF values 106 of the subset. The processor 610 of the DPS 150 can identify, within the subset, a lowest value of the plurality of MEF values 106 of the subset. The processor 610 of the DPS 150 can determine a carbon offset (e.g., the GHG potential offset 166) to achieve using the battery (e.g., ESS 116) based on a difference between the highest value adjusted for an energy loss 178 corresponding at least to electricity transmission associated with the battery (e.g., ESS 116) and the lowest value.

The processor 610 of the DPS 150 can identify a time period (e.g., a time period for charging ESS 116 and discharging the ESS 116) corresponding to the subset of the plurality of MEF values 106. The time period can include a time duration in which the battery (e.g., ESS 116) is charged by the utility provider 102 and discharged to an energy load 122. The processor 610 of the DPS 150 can provide for display (e.g., to a user device 210) the carbon offset (e.g., GHG potential offset 166) corresponding to the time period.

The processor 610 of the DPS 150 can determine the energy loss 178 based at least on an amount of energy provided by the utility provider 102 to the battery (e.g., ESS 116) during the battery charge and an amount of energy provided by the battery (e.g., ESS 116) to an energy load 122 during the battery discharge. For example, the energy loss 178 can include the energy loss associated with charging the ESS 116 and discharging the ESS 116. The energy loss 178 can include losses due to electricity transmission through power lines 138. The energy loss 178 can include losses due to The processor 610 of the DPS 150 can identify the highest value within a first time interval in which the battery (e.g., ESS 116) is discharged. The processor 610 of the DPS 150 can identify the lowest value within a second time interval in which the battery (e.g., ESS 116) is charged and determine the carbon offset (e.g., GHG potential offset 166) according to a MEF offset determined corresponding to a time period in which the battery is charged and discharged. For example, the MEF offset can be the difference in value between the maximum MEF value and the minimum MEF value.

The processor 610 of the DPS 150 can identify a first subset of the plurality of MEF values 106 within a first time interval. The first subset can include the highest MEF value 106. Each MEF value 106 of the first subset can exceed a first threshold. The first threshold can include for example, a value that is a fraction of the maximum MEF value 106. For example, the first threshold can be at least 95%, 90%, 85%, 80%, 75%, 70%, 65%, 60%, 55% or 50% of the maximum value. For example, the first threshold can be at least 95%, 90%, 85%, 80%, 75%, 70%, 65%, 60%, 55% or 50% of the difference between the maximum MEF value 106 and the minimum MEF Value 106. The processor 610 of the DPS 150 can identify a second subset of the plurality of MEF values 106 within a second time interval. The second subset can include the lowest MEF value 106. Each value of the second subset can be exceeded by a second threshold. The second threshold can be lower than the first threshold. The second threshold can be same as the first threshold. For example, the second threshold can be up to 5%, 10%, 15%, 20%, 25%, 30%, 35%, 40%, 45% or 50% greater than the minimum value. For example, the second threshold can be at least 5%, 10%, 15%, 20%, 25%, 30%, 35%, 40%, 45% or 50% greater than the difference between the maximum MEF value 106 and the minimum MEF Value 106. The processor 610 of the DPS 150 can generate a first MEF value 106 corresponding to the first subset reduced by a value corresponding to the energy loss 178. The processor 610 of the DPS 150 can determine the carbon offset (e.g., GHG potential offset 166) according to a MEF offset based on a difference between the highest value and the lowest value.

The processor 610 of the DPS 150 can generate a value corresponding to the energy loss 178. The value of the energy loss 178 can be indicative of the percentage of electricity dissipated during the battery charge and the battery discharge. The processor 610 of the DPS 150 can determine the carbon offset (e.g., GHG potential offset 166) based at least on the difference between the highest value reduced using the value corresponding to the energy loss 178 and the lowest value. The processor 610 of the DPS 150 can provide for display to a user device 210 the carbon offset (e.g., GHG potential offset 166).

The processor 610 of the DPS 150 can receive a first subset of the plurality of MEF values 106 from a first electricity source 140 on an electrical grid coupled with the provider and a second subset of the plurality of MEF values 106 from a second source 140 on the electrical grid 202. The processor 610 of the DPS 150 can modify the first MEF value 106 to conform a format of the first MEF value 106 to a format of the second MEF value 106. The first format can include MEF values 106 displayed in a different range than the MEF values 106 of the second format. The first format can include MEF values 106 at different range of timestamps 108 or different periodicity (e.g., every one or more hours, every one or more days) than MEF values 106 of the first format (e.g., every 15 or 30 minutes). The processor 610 of the DPS 150 can generate the plurality of MEF values 106 including the modified first value and the second value. The generated plurality of MEF values 106 can include the modified first value and the second value in the same (e.g., converted) format and with same or aligned timestamps.

The processor 610 of the DPS 150 can determine the carbon offset (e.g., GHG potential offset 166) corresponding to a time period that includes a time duration in which the battery (e.g., ESS 116) is charged by the utility provider 102 and discharged to an energy load 122. The processor 610 of the DPS 150 can provide the carbon offset (e.g., GHG potential offset 166) for display to a user device 210. The processor 610 of the DPS 150 can determine the carbon offset corresponding to a time period of one of: a day, a week, a month or a year. The processor 610 of the DPS 150 can provide the carbon offset (e.g., GHG potential offset 166) corresponding to the time period for display to a user device 210.

A non-transitory computer-readable medium having processor readable instructions. The instructions can be such that, when executed, cause one or more processors 610 to receive a plurality of MEF values 106 indicative of a marginal emission factor (MEF) of electricity provided by a utility provider 102 of electricity coupled with a battery (e.g., ESS 116). The instructions can cause one or more processors 610 to identify, within a subset of the plurality of MEF values 106, a highest MEF value 106 of the plurality of MEF values 106 of the subset. The instructions can cause one or more processors 610 to identify, within the subset, a lowest MEF value 106 of the plurality of MEF values 106 of the subset. The instructions can cause one or more processors 610 to determine a carbon offset (e.g., GHG potential offset 166) to achieve using the battery based on a difference between the highest MEF value 106 adjusted for an energy loss 178 corresponding at least to electricity transmission associated with the battery (e.g., ESS 116) and the lowest MEF value 106.

The instructions can cause one or more processors 610 to identify a time period corresponding to the subset of the plurality of MEF values 106. The time period can include a time duration in which the battery (e.g., ESS 116) is charged by the utility provider 102 and discharged to an energy load 122. The instructions can cause one or more processors 610 to provide for display the carbon offset (e.g., GHG potential offset 166) corresponding to the time period.

In some aspects, the present disclosure relates to a system for reducing a greenhouse gas emission of an asset using a battery (e.g., ESS 116). The system can include a DPS 150. DPS 150 can include one or more processors 610 to identify a plurality of MEF values 106 corresponding to a marginal emission factor (MEF) of a provider of electricity coupled with a battery. The one or more processors 610 of the DPS 150 can determine a discharge period to discharge the battery (e.g., ESS 116) according to a time interval for which a subset of the plurality of MEF values 106 adjusted for an energy loss 178 corresponding to power transmission exceeds a threshold. The one or more processors 610 of the DPS 150 can determine a charge period to charge the battery (e.g., ESS 116) according to a second time interval for which a second subset of MEF values 106 of the plurality of MEF values 106 remains below the threshold. The one or more processors 610 of the DPS 150 can provide a setting (e.g., operating parameter 132) to operate the battery (e.g., ESS 116) according to the charge period and the discharge period.

The one or more processors 610 of the DPS 150 can identify a plurality of timestamps 108 corresponding to the plurality of MEF values 106. The plurality of timestamps 108 can correspond to a future time interval. The one or more processors 610 of the DPS 150 can provide the setting (e.g., operating parameter 132) to operate the battery (e.g., ESS 116) according to the charge period and the discharge period corresponding to the future time interval. The charge period and the discharge period can correspond to a time duration in which the ESS 116 is to be charged during the future time interval.

The one or more processors 610 of the DPS 150 can forecast the plurality of MEF values 106 of the MEF corresponding to a future time interval based on a second plurality of MEF values 106 of the MEF corresponding to a prior time interval. The one or more processors 610 of the DPS 150 can determine the discharge period based on the time interval within the future time interval and the charge period based on the second time interval within the future time interval.

The one or more processors 610 of the DPS 150 can provide the setting (e.g., operating parameter 132) to operate the battery (e.g., ESS 116) according to the charge period and the discharge period in the future time interval. The one or more processors 610 of the DPS 150 can determine a parameter (e.g., operating parameter 132) corresponding to at least one of an overlap between the charge period and a charging time interval in which the battery (e.g., ESS 116) was previously charged by the utility provider 102, or an overlap between the discharge period and a discharging time interval in which the battery (e.g., ESS 116) was previously discharged to an energy load 122. The one or more processors 610 of the DPS 150 can determine the setting (e.g., operating parameter 132) to operate the battery (e.g., ESS 116) according to the parameter.

The one or more processors 610 of the DPS 150 can determine a parameter (e.g., operating parameter 132) indicative of an overlap between the charge period and a charging time interval in which the battery (e.g., ESS 116) was previously charged and an overlap between the discharge period and a discharging time interval in which the battery (e.g., ESS 116) was previously discharged. The one or more processors 610 of the DPS 150 can determine a target MEF offset to be achieved by the battery (e.g., ESS 116) according to the setting (e.g., operating parameter 132) adjusted by the parameter (e.g., operating parameter 132).

The one or more processors 610 of the DPS 150 can forecast the plurality of MEF values 106 corresponding to the MEF of the utility provider 102 for a future time interval using historical data comprising a second plurality of MEF values 106 corresponding to the MEF. The one or more processors 610 of the DPS 150 can determine the energy loss 178 corresponding to power transmission between the utility provider 102 and the battery (e.g., ESS 116), power transmission between the battery (e.g., ESS 116) and the energy load 122 and energy loss corresponding to charge and discharge of the battery (e.g., ESS 116). The one or more processors 610 of the DPS 150 can determine the discharge period to discharge the battery (e.g., ESS 116) based on the time interval within the future time interval for which a subset of the plurality of MEF values 106 adjusted according to the energy loss 178 exceeds the threshold.

The one or more processors 610 of the DPS 150 can determine a charge period to charge the battery (e.g., ESS 116) based the subset of the plurality of MEF values 106 reduced according to the energy loss 178. The one or more processors 610 of the DPS 150 can determine a discharge period to discharge the battery (e.g., ESS 116) according to the threshold determined based the second subset of MEF values 106 of the plurality of MEF values 106. The one or more processors 610 can provide a setting (e.g., operating parameter 132) to operate the battery (e.g., ESS 116) according to the discharge period. The one or more processors 610 of the DPS 150 can wherein the threshold corresponds to an average of a maximum MEF value 106 of the subset of the plurality of MEF values 106 adjusted according to the energy loss 178 and an average minimum MEF value 106 of the second subset of the plurality of MEF values 106.

The present solution can relate to a non-transitory computer-readable medium having processor readable instructions. The instructions, when executed, can cause one or more processors 610 to identify a plurality of MEF values 106 corresponding to marginal emission factor (MEF) of a utility provider 102 of electricity coupled with a battery (e.g., ESS 116). The instructions can cause one or more processors 610 to determine a discharge period to discharge the battery (e.g., ESS 116) according to a time interval for which a subset of the plurality of MEF values 106 adjusted for a loss in energy corresponding to power transmission exceeds a threshold. The instructions can cause one or more processors 610 to determine a charge period to charge the battery (e.g., ESS 116) according to a second time interval for which a second subset of MEF values 106 of the plurality of MEF values 106 remains below the threshold. The instructions can cause one or more processors 610 to provide a setting to operate the battery (e.g., ESS 116) according to the charge period and the discharge period.

The instructions can cause one or more processors 610 to identify a plurality of timestamps corresponding to the plurality of MEF values 106, the plurality of timestamps 108 identifying a future time interval. The instructions can cause one or more processors 610 to provide the setting to operate the battery (e.g., ESS 116) according to the charge period and the discharge period in the future time interval.

Figure 3:
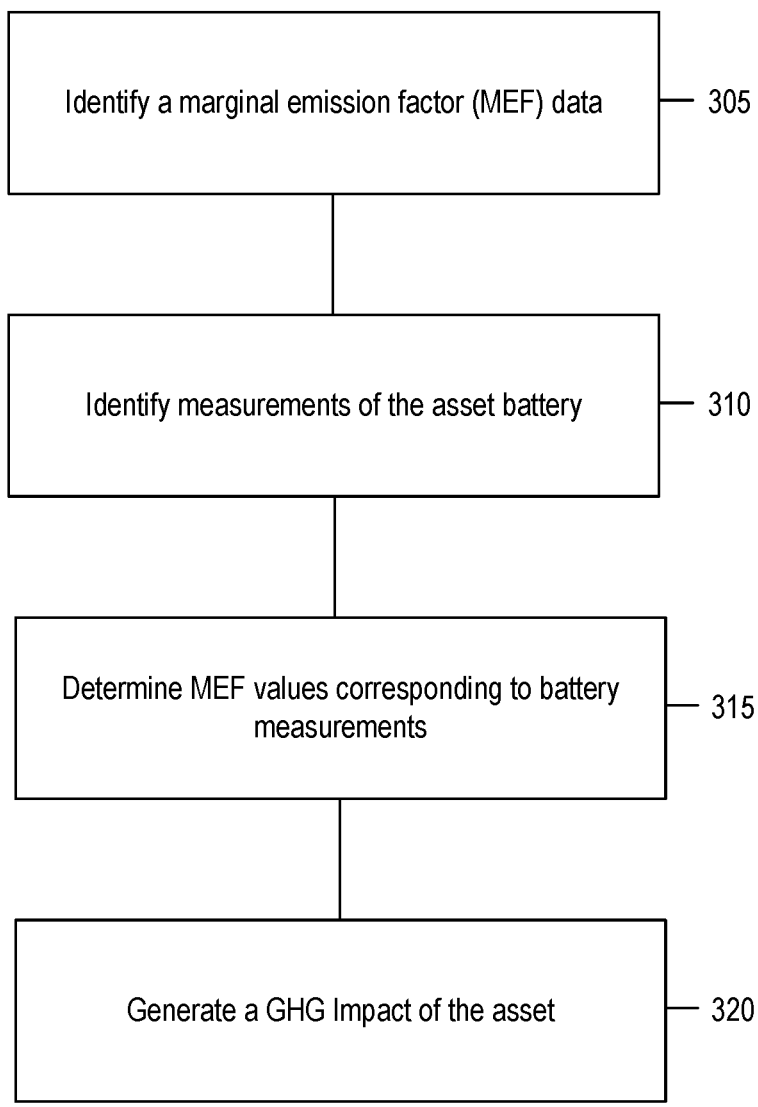
FIG. 3 illustrates an example method of determining a GHG impact by an asset using the MEF data of a utility provider.

FIG. 3 illustrates an example method 300. The method 300 can be implemented by any combination of systems 100 or 200 and can determine an amount of greenhouse gas associated with an asset. The method 300 can include ACTS 305 through 320. At ACT 305, a data processing system identifies a marginal emission factor (MEF) data. At ACT 310, the data processing system can identify measurements of the asset battery. At ACT 315, the data processing system can determine MEF values corresponding to battery measurements. At ACT 320, the data processing system can generate a GHG impact of the asset.

At ACT 305, the method can include a data processing system identifying a data corresponding to MEF. The data processing system can identify a first data set comprising a plurality of values corresponding to MEF of electricity provided by a utility provider of electricity over a time period. The time period can include a day, multiple days, a week, multiple weeks, a month or multiple months. The data can include MEF values associated with or corresponding to timestamps. Each MEF value can correspond to a timestamp indicating the timing of the corresponding MEF value. The MEF data can include an array of pairs, each pair including a MEF value and a timestamp. The MEF values and their timestamps can indicate that MEF data includes values taken over the time period at any periodicity, such as every day, even 12 hours, every 6 hours, every 3 hours, every hour, every 30 minutes, every 15 minutes, every 5 minutes or every minute. MEF values can vary. For example, MEF values can increase or be high when electricity corresponding to high carbon equivalent or high GHG is produced. MEF values can decrease or be low when electricity corresponding to low carbon equivalent or low GHG is produced. MEF values can include any values. Some electricity sources can provide raw MEF values. Some electricity sources can provide normalized MEF values. MEF values can be received from remote servers, cloud storage which can be associated with, coupled with, included with, remote from or disassociated with utility providers or electricity sources.

The data processing system can receive a first value of the plurality of values corresponding to MEF from a first electricity source associated with the utility provider of electricity. The first value can be a MEF value corresponding to electricity from the first electricity source providing electricity to the utility provider. The data processing system can include a second value of the plurality of values corresponding to MEF from a second electricity source associated with the provider of electricity. The second value can be a MEF value corresponding to electricity from the second electricity source providing electricity to the utility provider. The data processing system can include at least the first value that is modified to conform to the format or characteristics of the second value.

The data processing system can generate the first data set of MEF values to include the modified first value and the second value. The data processing system can generate the first data set to include any number of subsets of MEF values from any number of power sources, or a combined first data set including MEF values that are generated based on, according to, or by combining MEF values from any number of electricity sources. The first and second electricity sources can include power plants, such as solar plants, wind power plants, natural gas power plants, hydroelectric power plants or nuclear power plants.

The data processing system can identify for a first value of the first data set of MEF values received from a first electricity source on a utility grid a first timestamp corresponding to the first value. The data processing system can identify for a second value of the first data set of MEF values received from a second electricity source on the utility grid a second timestamp corresponding to the second value. The data processing system can generate the first data set to include the first value arranged in an order of the plurality of values of the first data set according to the first timestamp and the second value arranged in the order according to the second timestamp. For example, the first data set of the MEF values can be generated to include the first value in an order so as to precede the second value because the first value has a timestamp identifying a time that precedes the time one the timestamp of the second value.

At ACT 310, the data processing system can identify measurements of the asset battery. The method can include the data processing system identifying a second data set comprising a plurality of measurements corresponding to power of a battery of an asset coupled with the provider of electricity over the time period. The data processing system can receive the plurality of measurements from a meter coupled with the battery. The measurements can be measured by a sensor on the meter. The measurements can be received and monitored by the energy storage system monitor. The energy storage system monitor can send the measurements of the energy storage system to the data processing system. The plurality of measurements can identify the energy charged or discharged by the energy storage system (e.g., a battery). The plurality of measurements can include timestamps identifying the time interval during which energy storage system (e.g., the battery) is charged and a time interval during which the energy storage system is discharged.

The data processing system can identify, based on the plurality of measurements and the plurality of timestamps, a first portion of the time period in which the battery was charged and a second portion of the time period in which the battery was discharged. The data processing system can identify, from the plurality of measurements received from a meter coupled with the battery, a first subset of the plurality of measurements corresponding to a first portion of the time period during which the battery is charged from the utility provider of electricity on an electrical grid. The data processing system can identify, from the plurality of measurements, a second subset of the plurality of measurements corresponding to a second portion of the time period during which the battery is discharged to an electrical load on a local grid that is separated from the utility grid by the meter.

The data processing system can receive, from a sensor, the plurality of measurements including a first measurement corresponding to electricity charged to the energy storage system (e.g., the battery) according to a first timestamp and a second measurement corresponding to electricity discharged from the energy storage system (e.g., the battery) at a second timestamp. The data processing system can identify a plurality of timestamps associated with the plurality of values corresponding to MEF during the time period. The plurality of values can include a first value corresponding to a third timestamp and a second value corresponding to a fourth timestamp.

At ACT 315, the data processing system can determine MEF values corresponding to battery measurements. The method can include the data processing system determining a plurality of MEF values corresponding to use of the energy storage system (e.g., the battery) based on the plurality of values and the plurality of measurements over the time period. The data processing system can identify, using a plurality of timestamps corresponding to the plurality of measurements, a first portion of the time period during which the energy storage system (e.g., the battery) is charged and a second portion of the time period during which the energy storage system (e.g., the battery) is discharged. The data processing system can determine a first subset of the plurality of MEF values corresponding to the first portion of the time period during which the battery is charged and the second subset of the plurality of MEF values corresponding to the second portion of the time period during which the battery is charged.

The data processing system can determine that a first value corresponds to a first portion of the time period corresponding to the battery discharging based on a match between the first timestamp of the first measurement and third timestamp of the first value. The data processing system can determine that a second value corresponds to a second portion of the time period corresponding to the battery charging based on a match between the second timestamp of the second measurement and fourth timestamp of the second value.

At ACT 320, the data processing system can generate a GHG impact of the asset. The method can include data processing system generating, based on the plurality of MEF values, the amount of carbon (e.g., the weight of the CO2 equivalent) that is associated with the site or the asset that uses the energy storage system (e.g., the battery) over the time period. The data processing system can generate the amount of carbon (e.g., the amount of CO2 equivalent) according to a difference between a first subset of the plurality of values corresponding to a first portion of the time period when the battery is discharged and a second subset of the plurality of values corresponding to a second portion of the time period when the battery is charged.

The data processing system can determine, using a first timestamp corresponding to a first value of the plurality of values and a second timestamp of a first measurement of the plurality of measurements, a first amount of carbon (e.g., amount of CO2 equivalent) corresponding to a first portion of the time interval during which the battery is discharged. The data processing system can determine, using a third timestamp corresponding to a second value of the plurality of values and a fourth timestamp corresponding to a second measurement of the plurality of measurements. A second amount of carbon (e.g., amount of CO2 equivalent) corresponding to a second portion of the time interval during which the energy storage system (e.g., battery) is charged. The data processing system can generate the amount of carbon (e.g., GHG impact of the site or asset) according to a difference between the first amount of carbon and the second amount of carbon.

Figure 4:
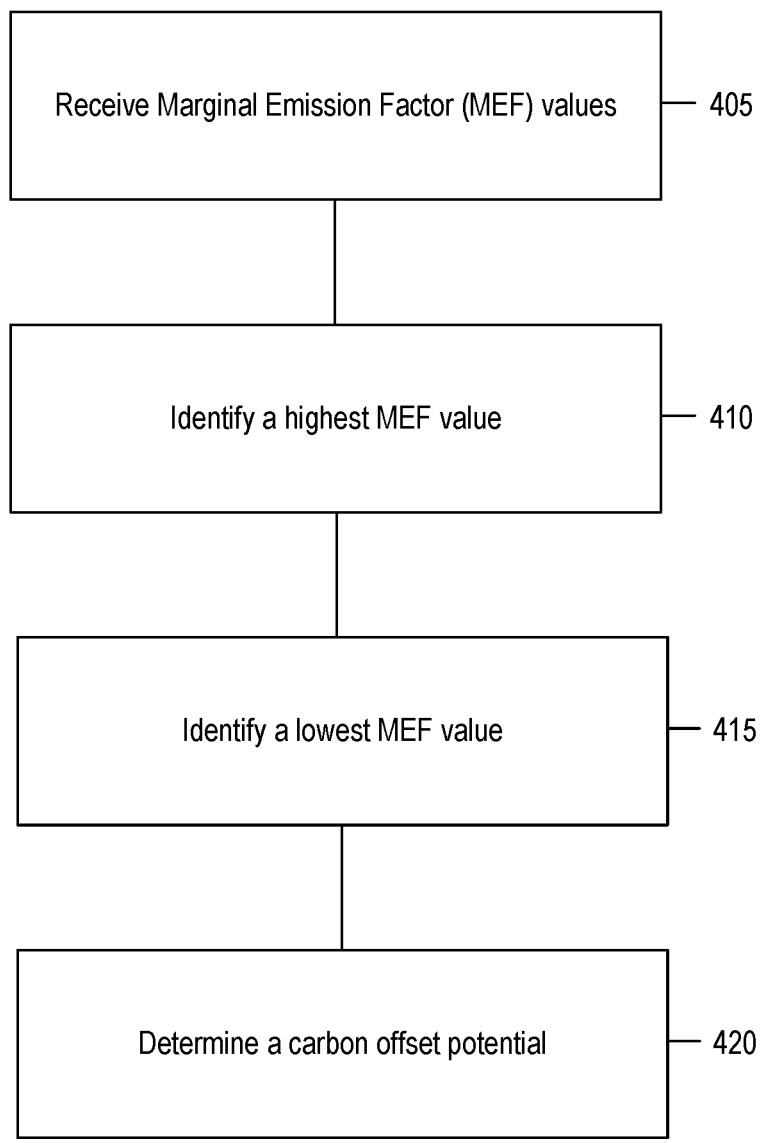
FIG. 4 illustrates an example method of using MEF data to determine a potential for mitigating GHG emission by an asset.

FIG. 4 illustrates an example method 400. The method 400 can be implemented by any combination of systems 100 or 200 and can determine a greenhouse gas mitigation potential of an asset or a site. The method 400 can include ACTS 405 through 420. At ACT 405, a data processing system can receive MEF values. At ACT 410, the data processing system can identify a highest MEF value. At ACT 415, the data processing system can identify a lowest MEF value. At ACT 420, the data processing system can determine a carbon offset potential of the asset.

At ACT 405, a data processing system can receive MEF values. The method can include the data processing system receiving a plurality of values indicative of a marginal emission factor (MEF) of electricity provided by a provider of electricity coupled with a battery. The plurality of values can include a first value that is larger than a second value. The first value can correspond to a maximum value or the highest value in the MEF data set. The second value can correspond to a minimum value or the lowest value in the MEF data set.

The plurality of values can vary over time. MEF values can vary depending on the time of day. For example, MEF values can be on average lower in the morning or middle of the day than in the evening. The MEF values can be on average higher in the morning or middle of the day than in the evening. The MEF values can vary depending on the day of the week, the week in the month or the month in the year. The MEF values in the winter can be larger than the MEF values in the summer, and vice versa. The plurality of values can correspond to MEF values over the course of a day, a plurality of days, a week, a plurality of weeks or a year.

The data processing system can receive a first subset of the plurality of values from a first source on a utility grid coupled with the provider. The data processing system can receive a second subset of the plurality of values from a second source coupled with the utility grid. The data processing system can modify the first value to conform a format of the first value to a format of the second value. The data processing system can combine the first and the second values into the plurality of values (e.g., the MEF data set). The data processing system can generate the plurality of values including the modified first value and the second value.

At ACT 410, the data processing system can identify a highest MEF value. The method can include the data processing system identifying, within a subset of the plurality of values, a highest value of the plurality of values of the subset. The highest MEF value can be the value that is the highest or largest value in the plurality of values (e.g., the MEF data set). The highest value of the plurality of MEF values can be the value that is highest or largest in a time period corresponding to a duration in which an energy storage system is charged and discharged (e.g., a single charge and discharge cycle). The data processing system can identify the highest value within a first time interval in which the battery is discharged.

The data processing system can identify a first subset of the plurality of values within a first time interval. The first subset can include the highest value. Each value of the first subset can exceed a first threshold. The first subset of the plurality of values can include MEF values that each exceed a threshold for identifying the subset of values with MEF maximum. For example, the first subset can include multiple MEF values, each of which is within 5% or 10% of the maximum value. Each of the values of the first subset can be within the same first time interval comprising the highest value.

At ACT 415, the data processing system can identify a lowest MEF value. The method can include the data processing system identifying, within the subset, a lowest value of the plurality of values of the subset. The data processing system can identify the lowest value within a second time interval in which the battery is charged. The lowest MEF value can be the value that is the lowest or smallest value in the plurality of values (e.g., the MEF data set). The lowest value of the plurality of MEF values can be the value that is lowest or smallest in a time period corresponding to a duration in which an energy storage system is charged and discharged (e.g., a single charge and discharge cycle).

The data processing system can identify a second subset of the plurality of values within a second time interval. The second subset can include the lowest value. Each value of the second subset can be exceeded by a second threshold. The second threshold can be lower than the first threshold. The second subset can include the lowest value. Each value of the second subset can be below the second threshold. The second subset of the plurality of values can include MEF values that each remain below the second threshold for identifying the subset of values with MEF minimum. For example, the second subset can include multiple MEF values, each of which is within 5% or 10% of the minimum value. Each of the values of the second subset can be within the same second time interval comprising the lowest value.

At ACT 420, the data processing system can determine a carbon offset potential of the asset. Method can include the data processing system determining a carbon offset to achieve using the battery based on a difference between the highest value (e.g., highest MEF value in the MEF data set)

adjusted for a loss in energy corresponding at least to electricity transmission associated with the battery and the lowest value (e.g., lowest MEF value in the MEF data set). The data processing system can identify a time period corresponding to the subset of the plurality of values. The time period can include a time duration in which the battery is charged by the provider and discharged to a load. The data processing system can provide for display the carbon offset corresponding to the time period.

The data processing system can determine the loss in energy based at least on an amount of energy provided by the provider to the battery during the battery charge and an amount of energy provided by the battery to a load during the battery discharge. The data processing system can determine the carbon offset according to a MEF offset determined corresponding to a time period in which the battery is charged and discharged. The data processing system can generate a first value corresponding to the first subset reduced by a value corresponding to the loss in energy. The data processing system can determine the carbon offset according to a MEF offset based on a difference between the first value and the lowest value.

The data processing system can generate a value corresponding to the loss in energy. The value can be indicative of the percentage of electricity dissipated during the battery charge and the battery discharge. The data processing system can determine the carbon offset based at least on the difference between the highest value (e.g., peak in the MEF data 104 or forecast MEF data 172) reduced using the value corresponding to the loss in energy and the lowest value (e.g., valley in the MEF data or forecast MEF data 172). The carbon offset (e.g., GHG impact) can be determined by multiplying the highest value with the factor that corresponds to, or is indicative of, the energy loss. The factor corresponding to the energy loss can be a number between 0 and 1.

The data processing system can provide the carbon offset for display to a user device. The data processing system can determine the carbon offset corresponding to a time period that includes a time duration in which the battery is charged by the provider and discharged to a load. The data processing system can determine the carbon offset corresponding to a time period of one of: a day, a week, a month or a year. The data processing system can provide the carbon offset corresponding to the time period for display.

Figure 5:
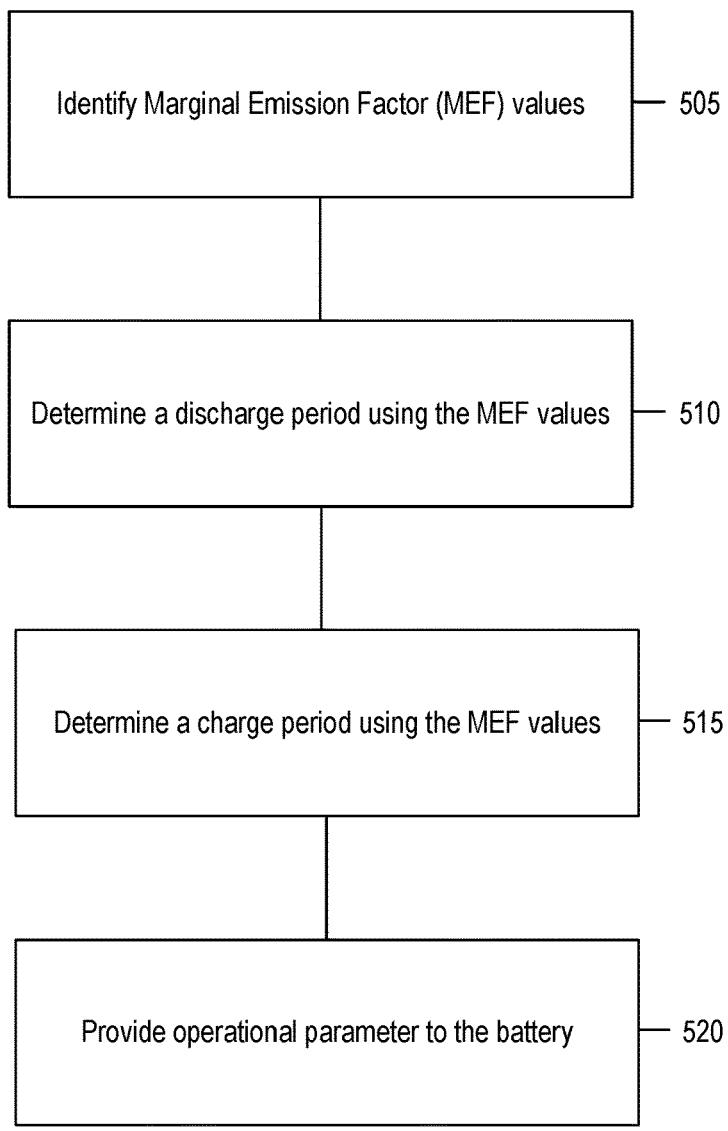
FIG. 5 illustrates an example method of reducing a GHG emission of an asset using MEF data of the utility provider to adjust operation of the energy storage system.

FIG. 5 illustrates an example method 500. The method 500 can be implemented by any combination of systems 100 or 200 and reduce a greenhouse gas emission of an asset (e.g., a site) using a battery (e.g., energy storage system). The method 500 can include ACTS 505 through 520. At ACT 505, a data processing system can identify MEF values. At ACT 510, the data processing system can determine a discharge period based on the MEF values. At ACT 515, the data processing system can determine a charge period based on the MEF values. At ACT 520, the data processing system can provide operational parameter to the battery.

At ACT 505, a data processing system can identify MEF values. The method can include identifying, by a data processing system, a plurality of MEF values corresponding to marginal emission factor (MEF) of a utility provider of electricity coupled with an energy storage system (e.g., a battery). The data processing system can identify a plurality of timestamps corresponding to the plurality of MEF values. For example, each MEF value can include a corresponding timestamp identifying a time corresponding to the MEF value. The plurality of timestamps can identify a future time interval. For example, the timestamps of the MEF values can correspond to forecasted or predicted MEF values in a future time interval. The data processing system can forecast the plurality of values corresponding to the MEF of the provider for a future time interval using historical data comprising a second plurality of values corresponding to the MEF.

The data processing system can forecast the plurality of values of the MEF corresponding to a future time interval using a second plurality of values of the MEF corresponding to a prior time interval. For example, the plurality of values can include MEF values forecasted for the utility provider in the future based on prior MEF values. The prior MEF values can be prior values of the utility provider over a period of time, or MEF values of other providers sharing characteristics or features of the utility provider. The shared characteristics or features can include same or similar region, same or similar type of power plant, same or similar type of technology used to generate electricity, or same or similar annual season, month, week, day or an hour of a day.

At ACT 510, the data processing system can determine a discharge period based on the MEF values. The method can include the data processing system determining a discharge period to discharge the battery according to a time interval for which a subset of the plurality of values adjusted for a loss in energy corresponding to power transmission exceeds a threshold. The discharge period can correspond to a time period in which to discharge the energy storage system. The subset of the plurality of values can include one or more values. The time interval can correspond to time interval identified by timestamps corresponding to MEF values. The energy loss can be reduced from the energy difference between the energy associated with the battery when the battery is charged when MEF values are their minimum or valley within a battery (e.g., ESS 116) charge/discharge cycle equivalent (e.g., daily) and the energy associated with the battery when the battery is discharged when the MEF values are at their maximum or peak within a battery (e.g., ESS 116) charge/discharge cycle equivalent.

The data processing system can determine the discharge period to discharge the battery based on the time interval within the future time interval for which a subset of the plurality of values adjusted according to the loss in energy exceeds the threshold. For example, a portion of the future time interval can include MEF values exceeding a predetermined threshold. The predetermined threshold can include values that are at least about 90%, 80% or 70% of the maximum MEF value. The predetermined threshold can include values that are at least about 90%, 80% or 70% of the difference between the maximum MEF value and the minimum MEF value.

The data processing system can establish the threshold corresponding to an average of a maximum value of the subset of the plurality of values adjusted according to the loss in energy and a minimum value of the second subset of the plurality of values. For example, a plurality of values of a subset of values corresponding to a time interval in which MEF values are at their maximum (e.g., above a threshold that is at about 5%, 10% or 15 from the maximum value) can be averaged. For example, a plurality of values of a subset of values corresponding to a time interval in which MEF values are at their minimum (e.g., below a threshold that is at about 5%, 10% or 15 from the minimum value) can be averaged. The averaged maximum value can be combined with the energy of battery corresponding to the battery discharge time and adjusted (e.g., reduced) for the energy loss corresponding to the electrical round trip time associated with the battery charge and discharge. The average minimum value combined with the energy of the battery for a time period when the battery is charged can be subtracted from the adjusted maximum value combined with the energy of the battery and adjusted for the energy loss to provide the parameter value to set or configure the operation of the battery.

The data processing system can determine a discharge period to discharge the battery according to the threshold. The threshold can be determined based the second subset of values of the plurality of values. For example, the threshold can be determined using the second subset of values that include the values below the threshold. The threshold can be determined based on a median, a mean or an average of the first plurality of values of the entire data set. The threshold for the discharge period can correspond to values above the median, mean or the average of the entire dataset (e.g., including both the first subset and the second subset). The data processing system can determine the discharge period based on the time interval within the future time interval and the charge period based on the second time interval within the future time interval.

At ACT 515, the data processing system can determine a charge period based on the MEF values. The method can include the data processing system determining a charge period to charge the battery according to a second time interval for which a second subset of values of the plurality of values remains below the threshold. The charge period can correspond to a period to charge an energy storage system. The threshold for the second plurality of values can be the same threshold as in ACT 510 or a threshold that is different that the threshold in ACT 510. For example, the data processing system can determine the charge period according to the second time interval in which the second subset of values remains below a second threshold. The second threshold can be below the first threshold in ACT 510.

The data processing system can determine the loss in energy corresponding to power transmission between the utility provider and the energy storage system (e.g., the battery). The data processing system can determine the loss in energy corresponding to the power transmission between the battery and the load. The data processing system can determine the loss in energy corresponding to the charge and discharge of the battery. The energy loss can include heat dissipation or inefficiencies in circuit components, such as power transformers or batteries. The data processing system can determine a charge period to charge the battery based the subset of the plurality of values reduced according to the loss in energy.

At ACT 520, the data processing system can provide operational parameter to the battery. The method can include the data processing system providing a setting to operate the battery according to the charge period and the discharge period. The data processing system can provide an operating parameter to operate the battery according to the charge period and the discharge period. The setting can include the operating parameter or can be based on the operating parameter. For example, the operating parameter can include a time to commence the charging of the energy storage system (e.g., the battery) or stop the charging of the energy storage system. The operating parameter can determine the rate of charge or discharge of the battery. For example, the operating parameter can include a time to commence the discharging of the energy storage system (e.g., the battery) or stop the discharging of the energy storage system.

The data processing system can provide the setting to operate the battery according to the charge period and the discharge period in the future time interval. For example, the setting can correspond to operation of the energy storage system in the future (e.g., operating parameter for the battery for future charging and discharging of the battery). The data processing system can provide the setting to operate the battery according to the charge period and the discharge period according to forecast MEF values corresponding to the future time interval or time interval corresponding to timestamps in the future.

The data processing system can determine a parameter for operating the battery corresponding to one of an overlap between the charge period and a charging time interval in which the battery was previously charged by the provider. The data processing system can determine the parameter for operating the battery corresponding to an overlap between the discharge period and a discharging time interval in which the battery was previously discharged to a load. The data processing system can determine the setting to operate the battery according to the parameter. The parameter can include a portion of a setting for operation of the energy storage system.

The data processing system can determine a parameter indicative of an overlap between the charge period and a charging time interval in which the battery was previously charged. The data processing system can determine a parameter indicative of an overlap between the discharge period and a discharging time interval in which the battery was previously discharged. The data processing system can determine a MEF offset to be achieved by the battery according to the setting adjusted by the parameter. The data processing system can provide a setting to the energy storage system (e.g., battery) on the site (e.g., the asset) to operate the energy storage system (e.g., the battery) according to the charge period or the discharge period.

Figure 6:
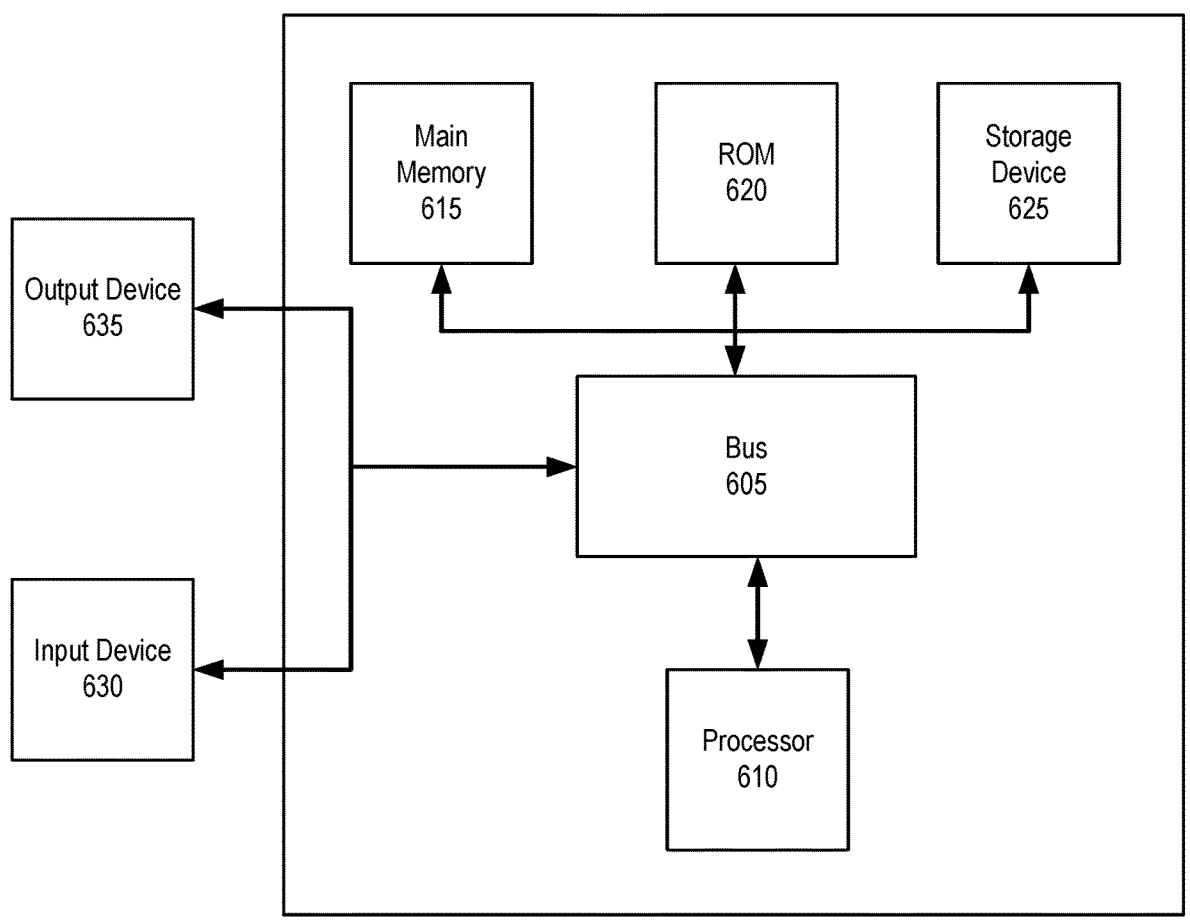
FIG. 6 depicts a block diagram illustrating an architecture for a computer system that can be employed to implement elements of the systems and methods described and illustrated herein, including, for example, the system depicted in FIGS. 1 and 2, and the operational flows or methods depicted in FIGS. 3, 4 and 5.

FIG. 6 is a block diagram of an example computer system 600. The computer system or computing device 600 can include or be used to implement the system 100, or its components such as the data processing system 150, ESS 116, meter 112, sub-meter 112, energy load 122 or controller 130. The computing system 600 includes a bus 605 or other communication component for communicating information and a processor 610 or processing circuit coupled to the bus 605 for processing information. The computing system 600 can also include one or more processors 610 or processing circuits coupled to the bus for processing information. The computing system 600 also includes main memory 615, such as a random access memory (RAM) or other dynamic storage device, coupled to the bus 605 for storing information, and instructions to be executed by the processor 610. The main memory 615 can be or include the data repository for storing any data or values described herein. The main memory 615 can also be used for storing position information, temporary variables, or other intermediate information during execution of instructions by the processor 610. The computing system 600 can further include a read only memory (ROM) 620 or other static storage device coupled to the bus 605 for storing static information and instructions for the processor 610. A storage device 625, such as a solid state device, magnetic disk or optical disk, can be coupled to the bus 605 to persistently store information and instructions. The storage device 625 can include or be part of the data repository.

The computing system 600 can be coupled via the bus 605 to an output 635, such as a liquid crystal display, or active matrix display, for displaying information to a user. An input device 630, such as a keyboard including alphanumeric and other keys, can be coupled to the bus 605 for communicating information and command selections to the processor 610. The input device 630 can include an output device 635, such as a touch screen display. The input device 630 can also include a cursor control, such as a mouse, a trackball, or cursor direction keys, for communicating direction information and command selections to the processor 610 and for controlling cursor movement on the output device 635, e.g., the display. The output 635 can be part of the data processing system 150, the controller 130 or other component of FIGS. 1 and 2, for example.

The processes, systems and methods described herein can be implemented by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement can also be employed to execute the instructions contained in main memory 615. Hard-wired circuitry can be used in place of or in combination with software instructions together with the systems and methods described herein. Systems and methods described herein are not limited to any specific combination of hardware circuitry and software.

Although an example computing system has been described in FIG. 6, the subject matter including the operations described in this specification can be implemented in other types of digital electronic circuitry, or in computer software, firmware, or hardware, including the structures disclosed in this specification and their structural equivalents, or in combinations of one or more of them.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 150) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 600 can include clients and servers. A client and server are generally remote from each other and typically interact through a communication network (e.g., the network 180). The relationship of client and server arises by virtue of computer programs running on the respective computers and having a client-server relationship to each other. In some implementations, a server transmits data (e.g., data packets representing a digital component) to a client device (e.g., for purposes of displaying data to and receiving user input from a user interacting with the client device). Data generated at the client device (e.g., a result of the user interaction) can be received from the client device at the server (e.g., received by the data processing system 150).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the ESS 116 and DPS 150 can be a single component, app, or program, or a logic device having one or more processing circuits, or part of one or more servers.

Having now described some illustrative implementations, it is apparent that the foregoing is illustrative and not limiting, having been provided by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method to determine an amount of greenhouse gas associated with an asset, the method comprising:

identifying, by a data processing system, a first data set comprising a plurality of values corresponding to marginal emission factor (MEF) of electricity provided by a provider of electricity over a time period, the plurality of values including a first MEF value associated with a first timestamp and corresponding to electricity provided to the provider from a first electricity source and a second MEF value associated with a second timestamp and corresponding to electricity provided to the provider from a second electricity source;

identifying, by the data processing system, a second data set comprising a plurality of measurements obtained by one or more sensors and corresponding to power of a battery of an asset coupled with the provider of electricity over the time period, the second data set including a first measurement associated with a third timestamp corresponding to a first portion of the time period in which the battery is charged and a second measurement associated with a fourth timestamp corresponding to a second portion of the time period in which the battery is discharged;

determining, by the data processing system, a plurality of MEF values corresponding to use of the battery by the asset over the time period based on the first MEF value, the second MEF value, the first measurement and the second measurement;

generating, by the data processing system via a neural network trained with historical MEF data, based on the plurality of MEF values, a value corresponding to an amount of carbon associated with the asset using the battery over the time period;

generating, by the data processing system, based on the value generated via the neural network, a setting to start charging the battery over a first portion of a subsequent time period during which MEF values are decreased below a threshold and start discharging the battery over a second portion of the subsequent time period during which MEF values are increased above the threshold; and applying, by the data processing system, the setting to the battery to reduce the amount of carbon associated with the asset over the subsequent time period relative to the time period.

2. The method of claim 1, comprising:

modifying, by the data processing system, at least a first format of the first MEF value associated with the first electricity source to conform to a second format of the second MEF value associated with the second electricity source; and generating, by the data processing system, the first data set to include the modified first MEF value and the second MEF value.

3. The method of claim 1, comprising:

identifying, by the data processing system, for the first MEF value of the first data set received from the first electricity source on a utility grid, the first timestamp corresponding to the first MEF value;

identifying, by the data processing system, for the second MEF value of the first data set received from the second electricity source on the utility grid, the second timestamp corresponding to the second MEF value; and generating, by the data processing system, the first data set to include the first MEF value arranged in an order of the plurality of values of the first data set according to the first timestamp and the second MEF value arranged in the order according to the second timestamp.

4. The method of claim 1, comprising:

receiving, by the data processing system, the plurality of measurements from a meter coupled with the battery, the plurality of measurements corresponding to a plurality of timestamps; and identifying, by the data processing system, based on the plurality of measurements and the plurality of timestamps, the first portion of the time period and the second portion of the time period.

5. The method of claim 1, comprising:

identifying, by the data processing system, from the plurality of measurements received from a meter coupled with the battery, a first subset of the plurality of measurements corresponding to the first portion of the time period during which the battery is charged from the provider of electricity on an electrical grid; and identifying, by the data processing system from the plurality of measurements, a second subset of the plurality of measurements corresponding to the second portion of the time period during which the battery is discharged to a load on a local grid separated from a utility grid by the meter.

6. The method of claim 1, comprising:

identifying, by the data processing system, using a plurality of timestamps corresponding to the plurality of measurements, the first portion of the time period during which the battery is charged and the second portion of the time period during which the battery is discharged; and determining, by the data processing system, a first subset of the plurality of MEF values corresponding to the first portion of the time period during which the battery is charged and the second subset of the plurality of MEF values corresponding to the second portion of the time period during which the battery is charged.

7. The method of claim 1, comprising:

determining, by the data processing system, that a first MEF value corresponds to the first portion of the time period corresponding to the battery charging based on a match between the first timestamp of the first measurement and the third timestamp of the first MEF value; and determining, by the data processing system, that a third MEF value corresponds to the second portion of the time period corresponding to the battery discharging based on a match between the second timestamp of the second measurement and the fourth timestamp of the second MEF value.

8. The method of claim 1, comprising:

generating, by the data processing system, the value corresponding to the amount of carbon according to a difference between a first subset of the plurality of values corresponding to the first portion of the time period and a second subset of the plurality of values corresponding to the second portion of the time period.

9. The method of claim 1, comprising:

determining, by the data processing system, using the first timestamp corresponding to the first MEF value of the plurality of values and the third timestamp of the first measurement, a first amount of carbon corresponding to a first portion of a time interval during which the battery is discharged;

determining, by the data processing system, using the second timestamp corresponding to the second MEF value and the fourth timestamp corresponding to the second measurement, a second amount of carbon corresponding to a second portion of the time interval during which the battery is charged; and generating, by the data processing system, the value corresponding to the amount of carbon according to a difference between the first amount of carbon and the second amount of carbon.

10. A system to determine an amount of greenhouse gas associated with an asset, the system comprising:

one or more processors coupled with memory to:

identify a first data set comprising a plurality of values corresponding to marginal emission factor (MEF) of electricity provided by a provider of electricity over a time period, the plurality of values including a first MEF value associated with a first timestamp and corresponding to electricity provided to the provider from a first electricity source and a second MEF value associated with a second timestamp and corresponding to electricity provided to the provider from a second electricity source;

identify a second data set comprising a plurality of measurements obtained by one or more sensors and corresponding to power of a battery of an asset coupled with the provider of electricity over the time period, the second data set including a first measurement associated with a third timestamp corresponding to a first portion of the time period in which the battery is charged and a second measurement associated with a fourth timestamp corresponding to a second portion of the time period in which the battery is discharged;

determine a plurality of MEF values corresponding to use of the battery by the asset over the time period based on the first MEF value, the second MEF value, the first measurement and the second measurement;

generate, via a neural network trained with historical MEF data, a value corresponding to an amount of carbon associated with the asset using the battery over the time period and based on the plurality of MEF values;

generate, based on the value generated via the neural network, a setting to start charging the battery over a first portion of a subsequent time period during which MEF values are decreased below a threshold and start discharging the battery over a second portion of the subsequent time period during which MEF values are increased above the threshold; and apply the setting to the battery to reduce the amount of carbon associated with the asset over the subsequent time period relative to the time period.

11. The system of claim 10, comprising the one or more processors to:
modify at least a first format of the first MEF value associated with the first electricity source to conform to a second format of the second MEF value associated with the second electricity source; and
generate the first data set to include the modified first MEF value and the second MEF value.

12. The system of claim 10, comprising the one or more processors to:
identify, for the first MEF value of the first data set received from a first device on an electrical grid, the first timestamp corresponding to the first MEF value;
identify, for the second MEF value of the first data set received from a second device on the electrical grid, the second timestamp corresponding to the second MEF value; and
generate the first data set to include the first MEF value arranged in an order of the plurality of values of the first data set according to the first timestamp and the second MEF value arranged in the order according to the second timestamp.

13. The system of claim 10, comprising the one or more processors to:
receive the plurality of measurements from a meter coupled with the battery, the plurality of measurements corresponding to a plurality of timestamps; and
identify, based on the plurality of measurements and the plurality of timestamps, the first portion of the time period and the second portion of the time period.

14. The system of claim 10, comprising the one or more processors to:
identify, from the plurality of measurements received from a meter coupled with the battery, a first subset of the plurality of measurements corresponding to the first portion of the time period during which the battery is charged from the provider of electricity on an electrical grid; and
identify, from the plurality of measurements, a second subset of the plurality of measurements corresponding to the second portion of the time period during which the battery is discharged to a load on a local grid separated from the electrical grid by the meter.

15. The system of claim 10, comprising the one or more processors to:
identify, using a plurality of timestamps corresponding to the plurality of measurements, the first portion of the time period during which the battery is charged and the second portion of the time period during which the battery is discharged; and
determine a first subset of the plurality of MEF values corresponding to the first portion of the time period during which the battery is charged and the second subset of the plurality of MEF values corresponding to the second portion of the time period during which the battery is charged.

16. The system of claim 10, comprising the one or more processors to:
determine that the first MEF value corresponds to the first portion of the time period corresponding to the battery discharging based on a match between the first timestamp and the third timestamp; and
determine that the second MEF value corresponds to the second portion of the time period corresponding to the battery charging based on a match between the second timestamp and the fourth timestamp.

17. The system of claim 10, comprising the one or more processors to:
generate the value corresponding to the amount of carbon according to a difference between a first subset of the plurality of values corresponding to the first portion of the time period and a second subset of the plurality of values corresponding to the second portion of the time period.

18. The system of claim 10, comprising the one or more processors to:
determine, using the first timestamp corresponding to the first MEF value of the plurality of values and the third timestamp of the first measurement, a first amount of carbon corresponding to a first portion of a time interval during which the battery is charged;
determine, using the second timestamp corresponding to the second MEF value and the fourth timestamp corresponding to the second measurement, a second amount of carbon corresponding to a second portion of the time interval during which the battery is discharged; and
generate the value corresponding to the amount of carbon according to a difference between the first amount of carbon and the second amount of carbon.

19. A non-transitory computer-readable medium having processor readable instructions, such that, when executed, cause one or more processors to:
identify a first data set comprising a plurality of values corresponding to marginal emission factor (MEF) of electricity provided by a provider of electricity over a time period, the plurality of values including a first MEF value associated with a first timestamp and corresponding to electricity provided to the provider from a first electricity source and a second MEF value associated with a second timestamp and corresponding to electricity provided to the provider from a second electricity source;
identify a second data set comprising a plurality of measurements obtained by one or more sensors and corresponding to power of a battery of an asset coupled with the provider of electricity over the time period, the second data set including a first measurement associated with a third timestamp corresponding to a first portion of the time period in which the battery is charged and a second measurement associated with a fourth timestamp corresponding to a second portion of the time period in which the battery is discharged;
determine a plurality of MEF values corresponding to use of the battery by the asset over the time period based on the first MEF value, the second MEF value, the first measurement and the second measurement;
generate, via a neural network trained with historical MEF data, a value corresponding to an amount of greenhouse gas associated with the asset using the battery over the time period and based on the plurality of MEF values;

generate, based on the value generated via the neural network, a setting to start charging the battery over a first portion of a subsequent time period during which MEF values are decreased below a threshold and start discharging the battery over a second portion of the subsequent time period during which MEF values are increased above the threshold; and apply the setting to the battery to reduce the amount of greenhouse gas associated with the asset over the subsequent time period relative to the time period.

20. The non-transitory computer-readable medium of claim 19, wherein the one or more processors are configured to:

modify at least a first format of the first MEF value associated with the first electricity source to conform to a second format of the second MEF value associated with the second electricity source; and generate the first data set to include the modified first MEF value and the second MEF value.

* * * * *